(12) United States Patent
Vos et al.

(10) Patent No.: US 10,764,847 B2
(45) Date of Patent: Sep. 1, 2020

(54) METHOD AND SYSTEM FOR USING ENHANCED PRIMARY SYNCHRONIZATION SIGNAL FOR RESYNCHRONIZATION

(71) Applicant: SIERRA WIRELESS, INC., Richmond (CA)

(72) Inventors: Gustav Gerald Vos, Surrey (CA); Naveen Mysore Balasubramanya, Karnataka (IN); Lutz Hans-Joachim Lampe, Vancouver (CA)

(73) Assignee: Sierra Wireless, Inc., Richmond, BC (CA)

( * ) Notice: Subject to any disclaimer, the term of this patent is extended or adjusted under 35 U.S.C. 154(b) by 0 days.

(21) Appl. No.: 15/968,929

(22) Filed: May 2, 2018

(65) Prior Publication Data

US 2018/0324722 A1  Nov. 8, 2018

Related U.S. Application Data

(60) Provisional application No. 62/500,324, filed on May 2, 2017.

(51) Int. Cl.
*H04W 56/00* (2009.01)
*H04W 88/08* (2009.01)
*H04W 88/02* (2009.01)

(52) U.S. Cl.
CPC .......... *H04W 56/001* (2013.01); *H04W 88/02* (2013.01); *H04W 88/08* (2013.01)

(58) Field of Classification Search
USPC ....................................................... 370/252
See application file for complete search history.

(56) References Cited

U.S. PATENT DOCUMENTS 6,097,933 A  8/2000 Bennett et al.
6,112,055 A  8/2000 Bennett et al.
(Continued)

FOREIGN PATENT DOCUMENTS

WO  2014/147396 A1  9/2014
WO  2014/181850 A2  11/2014
(Continued)

OTHER PUBLICATIONS

Office Action, U.S. Pat. No. 10,200,961, dated Oct. 24, 2016.
(Continued)

*Primary Examiner* — Gregory B Sefcheck
*Assistant Examiner* — Majid Esmaeilian
(74) *Attorney, Agent, or Firm* — Young Basile Hanlon & MacFarlane, P.C.

(57) ABSTRACT

A method and apparatus for using enhanced PSS (ePSS) transmitted from a base station, for example an eNB, for use by UEs for resynchronization of the UE with the base station is disclosed. According to some embodiments, when resynchronization using the ePSS fails on the first attempt, the UE non-coherently or coherently combines the ePSS with the legacy PSS/SSS in order to resynchronize the UE with the base station. According to some embodiments, when resynchronization using the ePSS fails on the first attempt, the UE non-coherently or coherently combines the ePSS reception results with the legacy PSS/SSS reception results in order to resynchronize the UE with the base station.

18 Claims, 16 Drawing Sheets

(56) References Cited

U.S. PATENT DOCUMENTS

| | | | |
|---|---|---|---|
| 9,094,168 B2* | 7/2015 | Yamada | H04W 56/0005 |
| 10,200,961 B2 | 2/2019 | Vos et al. | |
| 2013/0039268 A1 | 2/2013 | Blankenship et al. | |
| 2013/0288672 A1 | 10/2013 | He et al. | |
| 2014/0098782 A1* | 4/2014 | Shirazi | H04B 1/707 370/330 |
| 2014/0185534 A1* | 7/2014 | Vos | H04L 1/1845 370/329 |
| 2015/0085833 A1 | 3/2015 | Han et al. | |
| 2015/0117314 A1 | 4/2015 | Gou et al. | |
| 2016/0105862 A1* | 4/2016 | Charbit | H04W 4/70 370/336 |
| 2016/0157194 A1 | 6/2016 | Svedman et al. | |
| 2016/0212718 A1* | 7/2016 | Park | H04W 56/00 |
| 2016/0262123 A1* | 9/2016 | Abedini | H04W 56/0015 |
| 2017/0094624 A1* | 3/2017 | Balachandran | H04W 56/00 |
| 2017/0181065 A1 | 6/2017 | Svedman et al. | |
| 2018/0077660 A1* | 3/2018 | Ly | H04W 4/027 |
| 2018/0123859 A1* | 5/2018 | Liu | H04L 29/08423 |
| 2019/0029003 A1* | 1/2019 | Takeda | H04W 4/06 |
| 2019/0037609 A1* | 1/2019 | Harada | H04W 72/02 |

FOREIGN PATENT DOCUMENTS

| | | |
|---|---|---|
| WO | 2015/114566 A1 | 8/2015 |
| WO | 2015/148815 A1 | 10/2015 |
| WO | 2016/119061 A1 | 8/2016 |

OTHER PUBLICATIONS

Office Action, U.S. Pat. No. 10,200,961, dated Jul. 7, 2017.
Office Action, U.S. Pat. No. 10,200,961, dated Jan. 2, 2018.
Extended EU Search Report, EP 16742619.6, dated Aug. 28, 2018.
Ericsson, "On the Design of Discovery Bursts and Procedures", 3GPP TSR WG1 Meeting #76, vol. R1-140759, pp. 1-7 (Feb. 14, 2014).
Alcatel-Lucent, "Remaining details on CSI feedback for eIMTA", 3GPP TSG RAN WG1 Meeting #76bis, vol. R1-141241, Shenzhen, China (Mar. 31-Apr. 4, 2014).
Ericsson, "Design of Discovery Bursts and Procedures", Sec33GPP TSR WG1 Meeting #76bis, vol. R1-141642, pp. 1-8, Shenzhen, China (Apr. 4, 2014).
LG Electronics, "Clarification of PUSCH rate matching with SRS", 3GPP TSG-RAN WG1 Meeting #78bis, vol. R1-144011, Ljubljana, Slovenia (Oct. 6-10, 2014).
Sierra Wireless, "Coverage Enhancement PBCH Simulation Results and Proposals", 3GPP TSG RAN WG1 Meeting #79, vol. R1-144601, San Francisco, USA (Nov. 17-21, 2014).
RAN WG1, "LS on simultaneous reception requirements and SIBs for MTC UEs," 3GPP TSG RAN WG1 Meeting #79, vol. R1-145416, San Francisco, USA (Nov. 17-21, 2014).
3GPP Organizational Partners, "3rd Generation Partnership Project; Technical Specification Group Radio Access Network; Evolved Universal Terrestrial Radio Access (E-UTRA); LTE physical layer; General Description (Release 12)", TS 36.201, Version 12.1.0 (Dec. 2014).
3GPP Organizational Partners, "3rd Generation Partnership Project; Technical Specification Group Radio Access Network; Evolved Universal Terrestrial Radio Access (E-UTRA); User Equipment (UE) procedures in idle mode (Release 12)", TS 36.304, Version 12.3.0 (Dec. 2014).

* cited by examiner

METHOD AND SYSTEM FOR USING ENHANCED PRIMARY SYNCHRONIZATION SIGNAL FOR RESYNCHRONIZATION

CROSS REFERENCE TO RELATED APPLICATIONS

This application claims the benefit of priority to U.S. Provisional Patent Application No. 62/500,324 entitled "Method and System for Using Enhanced Primary Synchronization Signal for Resynchronization" filed May 2, 2017, the contents of which are incorporated herein by reference in their entirety.

FIELD OF THE INVENTION

The present invention pertains in general to the field of wireless communications systems such as the Long Term Evolution (LTE) system and in particular to a method and system for using an enhanced Primary Synchronization Signal for resynchronization.

BACKGROUND

Coverage of mobile User Equipment (UE) in 3GPP' LTE systems is an ongoing concern. The desire is to provide connectivity to UEs in marginal signal strength conditions without excessive power consumption requirements placed on the UE.

One task required by a UE when it wishes to camp on an LTE cell is to perform cell synchronization. Synchronization includes detecting the Primary Synchronization Signal (PSS) and the Secondary Synchronization Signal (SSS) transmitted by the cell's evolved NodeB (eNB) base station. The PSS is used to indicate the cell identity within a group of cells, and the SSS is used to indicate the cell identity group number. Three different PSS signals and 168 different SSS signals are typically available. An eNB may use a particular combination of both identifiers to convey its cell-ID. A hierarchical cell search is performed by the UE to identify the cell-ID by analysis of the particular PSS and SSS transmitted by the cell's eNB.

However, standard methods of detecting the PSS and SSS can consume relatively large amounts of time and energy, particularly in marginal signal conditions and/or when Discontinuous Reception (DRX) is employed by a UE.

There is a requirement for LTE Cat-M1 (LTE-M) and narrow band Internet-of-things (NB-IOT) to support a high maximum coupling loss (MCL), for example 164 dB. However, for resynchronization, for example resynchronization after a UE comes out of a deep sleep from power saving mode (PSM) or discontinuous reception (DRX) or extended DRX, where the cell providing service to the UE has not changed but the carrier frequency offset (CFO) and timing are unknown, it is difficult to achieve a similar high MCL and achieving the high MCL can take a long time using significant UE power and increased latency. FIG. 1 illustrates the performance of legacy PSS/SSS for resynchronization, under the assumption that the UE knows the SSS and PSS sequences. As can be seen in FIG. 1, the legacy PSS/SSS 90th percentile resynchronization can take approximately 2.5 seconds at 164 dB MCL. As such, the time period for resynchronization can be prohibitively long.

Therefore there is a need for a method and system for using enhanced Primary Synchronization Signals for resynchronization that is not subject to one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of the present invention is to provide a method and system for using enhanced Primary Synchronization Signals for resynchronization. In accordance with an aspect of the present invention, there is provided a method for resynchronizing a User Equipment (UE) to a base station. The method includes receiving, by a UE, a first set of synchronization signals and a second set of synchronization signals. The method further includes resynchronizing, by the UE, with the base station using the second set of synchronizing signals.

In accordance with another aspect of the present invention, there is provided a User Equipment (UE) for resynchronization with a base station. The UE includes a processor and a machine readable memory storing machine executable instructions. The machine readable instructions, when executed by the processor configure the user equipment to receive a first set of synchronization signals and a second set of synchronization signals. The machine readable instructions, when executed, further configure the UE to resynchronize with the base station using the second set of synchronizing signals.

According to some embodiments, when resynchronizing with the base station using the second set of synchronizing signals fails, the method further includes combining, by the UE, the first set of synchronizing signals and the second set of synchronizing signals to form a modified set of synchronizing signals and resynchronizing, by the UE, with the base station using the modified set of synchronizing signals. According to some embodiments, the combining is non-coherent combining. In some embodiments, the combining is coherent combining.

According to some embodiments, the second set of synchronization signals are time adjusted before combining the first set of synchronizing signals and the second set of synchronizing signals. In some embodiments, the first set of synchronization signals are time adjusted before combining the first set of synchronizing signals and the second set of synchronizing signals. In some embodiments, the first set of synchronization signals are zero padded before combining the first set of synchronizing signals and the second set of synchronizing signals.

DETAILED DESCRIPTION

Figure 1:
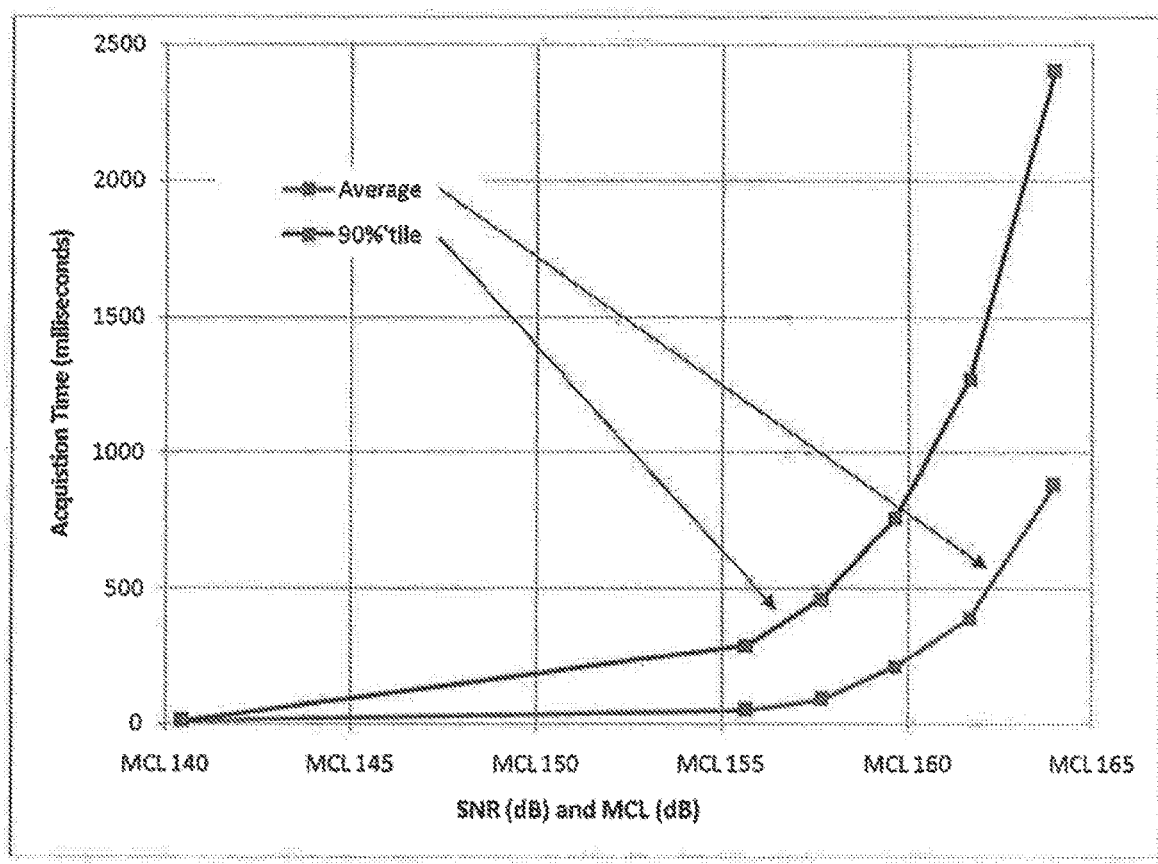
FIG. 1 illustrates the performance of legacy PSS and SSS for resynchronization of a UE with an eNB, when the UE previously knows the PSS and SSS.

In current LTE implementations, the Primary Synchronization Signal (PSS) and the Secondary Synchronization Signal (SSS) are used for synchronization of UEs in order to facilitate further communication via the LTE network, as would be readily understood by a worker skilled in the art.

In various existing LTE implementations, the PSS uses a Zadoff-Chu sequence which is widely used in LTE, including use for the uplink reference signals and random access preambles. Such sequences may be preferred because of their Constant Amplitude Zero Autocorrelation (CAZAC) property. A mathematical representation of such Zadoff-Chu sequences is as follows:

$$ZC^{63}{}_M(n) = \exp[-j\pi M n(n+1)/63], n=0, 1, \ldots, 62 \quad (1)$$

In typical existing LTE implementations, only three of the possible 63 roots are used by the PSS. These roots correspond to M=29, 34 and 25 in Equation (1). As such, it is recognized herein that 33 other roots are still available for use because roots that may be used must be co-prime.

In various existing LTE implementations, such as Frequency Division Duplexing (FDD) implementations with normal cyclic prefix and 20 MHz system bandwidth, the PSS and SSS are transmitted via 6 contiguous Physical Resource Blocks (PRBs) located at the center frequencies. For example when Resource Blocks 0 to 99 are implemented, the PRBs may correspond to Resource Blocks 47 to 52. The PSS may be transmitted in the last PRBs of a subframe while the SSS may be transmitted in the next-to-last PRBs of a subframe.

In various existing LTE implementations, the SSS depends on the group-ID and the sector-ID. To each possible group-ID, a pair of numbers m0 and m1 is assigned. Through those numbers, two sequences s0 and s1 can be generated using a length 31 linear feedback shift register. Those maximum-length sequences are then interleaved in the frequency domain. Afterwards there is a scrambling applied on the even and the odd subcarrier entries separately. For the scrambling, two additional sequences c0 and c1 are generated that are both based on a base scrambling code C. The shift value between the sequences indicates the sector-ID Ns. Further information about the generation of the base scrambling can be found in the 3GPP specification document numbered 3GPP TS 36.201 and entitled "3rd Generation Partnership Project; Technical Specification Group Radio Access Network; Evolved Universal Terrestrial Radio Access (E-UTRA); LTE physical layer; General description (Release 12)," Version 12.1.0 of which is dated December, 2014.

It is noted that the two transmissions of the SSS within a 10 ms Frame are different. Therefore a UE may detect which SSS transmission is the first in a frame and which SSS transmission is the second in a frame.

It is further noted that, for practical purposes, the SSS are m-sequences and thus exhibit relatively poor auto-correlation properties when compared to the Zadoff-Chu sequences used for the PSS.

DRX and Paging

Discontinuous Reception (DRX) is intended to improve UE battery life by allowing the UE enter an Idle mode and refrain from decoding downlink data in certain time periods, as would be readily understood by a worker skilled in the art. During DRX, in Idle mode, a UE may save power when it only monitors the Physical Downlink Control Channel (PDCCH) on one pre-determined Paging Occasion (PO) per DRX cycle, as specified for example in the 3GPP specification document numbered 3GPP TS 36.304 and entitled "3rd Generation Partnership Project; Technical Specification Group Radio Access Network; Evolved Universal Terrestrial Radio Access (E-UTRA); User Equipment (UE) procedures in idle mode (Release 12)," Version 12.3.0 of which is dated December 2014. The paging indication for the UE is received through Paging Radio Network Temporary Identifier (P-RNTI) on the PDCCH. If the UE does not find P-RNTI, it goes back to sleep. If the UE finds P-RNTI, it proceeds to decode Physical Downlink Shared Channel (PDSCH). The PDSCH will contain the SAE Temporary Mobile Subscriber Identity (S-TMSI) or International Mobile Security Identity (IMSI) list of UEs being paged. If the UE finds its S-TMSI or IMSI ID in the list, then it knows that it is paged. If not, it will go back to sleep.

ePSS

In accordance with embodiments of the present invention, there is provided a method and apparatus for wirelessly transmitting an enhanced PSS (ePSS) from an eNB for use by UEs. The ePSS functions similarly to the existing PSS but includes multiple copies of signals comparable to the existing PSS. Each of these multiple copies may be referred to herein as a component signal of the ePSS. The component signals may be transmitted in a burst, i.e. within a relatively short time frame. In various embodiments, the ePSS may be transmitted via the LTE Resource Elements (REs) which are, in current LTE systems, normally reserved for the Physical Downlink Shared Channel (PDSCH). UEs may be configured to receive and use the multiple copies inherent in the ePSS to decrease detection time and/or energy expenditure used for detection.

In accordance with embodiments of the present invention, there is provided a method and apparatus for using enhanced PSS (ePSS) transmitted from a base station, for example an eNB, for use by UEs for resynchronization of the UE with the base station. According to some embodiments, when resynchronization using the ePSS fails on the first attempt, the UE non-coherently or coherently combines the ePSS with the legacy PSS/SSS in order to resynchronize the UE with the base station. According to some embodiments, when resynchronization using the ePSS fails on the first attempt, the UE non-coherently or coherently combines the ePSS reception results with the legacy PSS/SSS reception results in order to resynchronize the UE with the base station.

It is understood that the ePSS can include repetitions of one or more of PSS, SSS or other synchronization signals that can be used in a LTE communication network or other communication system, as would be readily understood by a worker skilled in the art.

In various embodiments, the component signals are Zadoff-Chu sequences which are transmitted in time rather than in frequency. That is, the PSS in existing LTE implementations is conveyed via a set of symbols which are transmitted simultaneously and via a contiguous set of resource blocks/subcarriers. In contrast, in embodiments of the present invention, each component signal may comprise the same elements as the PSS, but these elements may be conveyed via a set of symbols which are transmitted via a set of resource blocks occurring sequentially in time and associated with a common set of subcarriers. The set of symbols may be contiguous.

Figure 2:
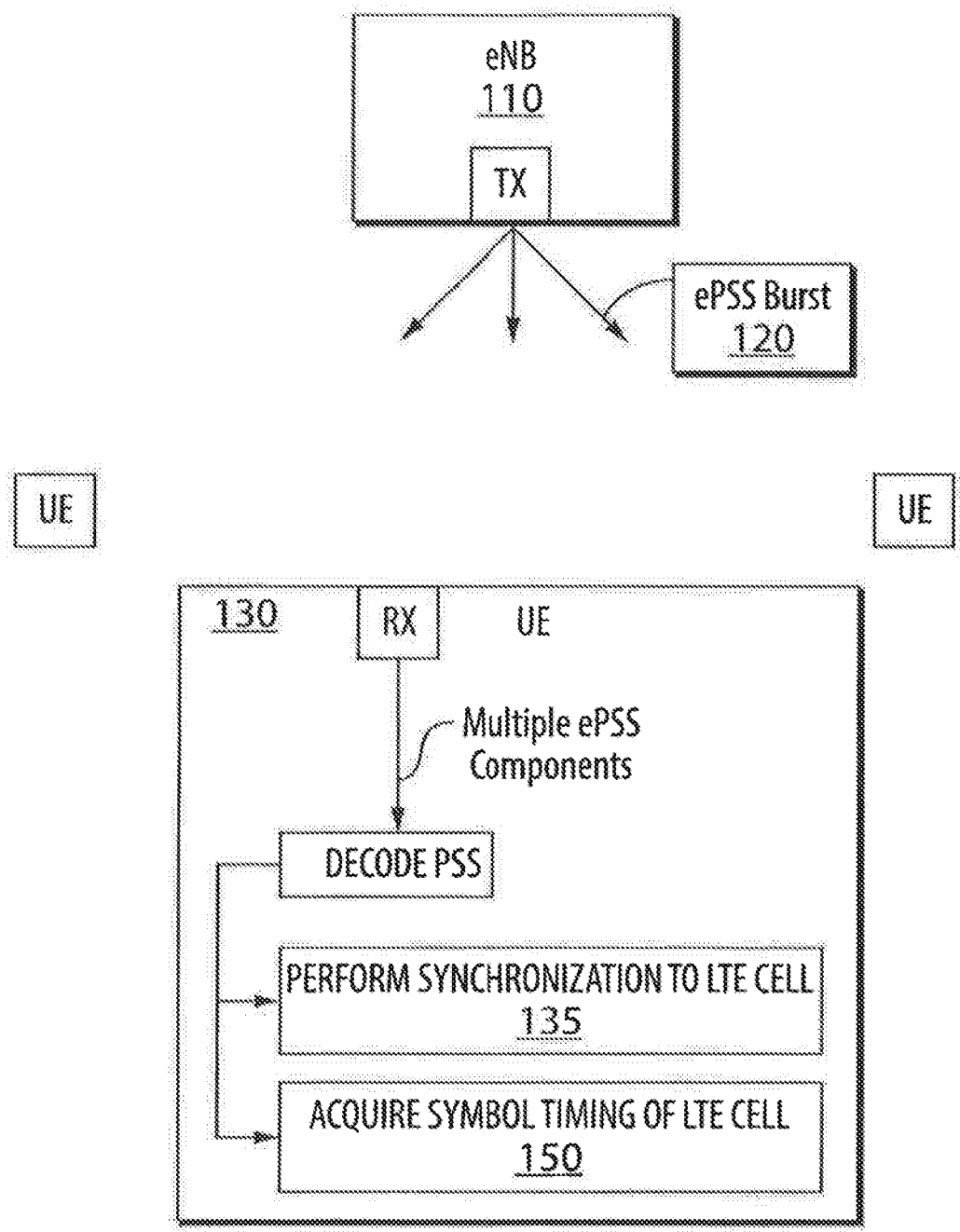
FIG. 2 illustrates a system including an evolved NodeB (eNB) and at least one User Equipment (UE), provided and configured in accordance with embodiments of the invention.

Having reference to FIG. 2, embodiments of the present invention provide for a system for facilitating synchronization in a Long Term Evolution (LTE) cell. The system includes an evolved NodeB (eNB) 110 and at least one User Equipment (UE) 130. The eNB 110 is configured to wirelessly transmit a burst 120 of multiple component signals, each of the component signals indicative of a Primary Synchronization Signal (PSS). Further, the burst is transmitted within a predetermined time frame, for example within one or two subframes. The UE 130 is configured to receive at least one and typically multiple component signals of the burst of multiple signals. The UE 130 is further configured to decode the PSS based on the received at least one component signal. The UE 130 may further be configured to perform 135 synchronization to the LTE cell based at least in part on the decoded PSS. Additionally or alternatively to performing synchronization, the UE may be configured to acquire 150 symbol timing of the LTE cell based at least in part on the decoded PSS.

Figure 3:
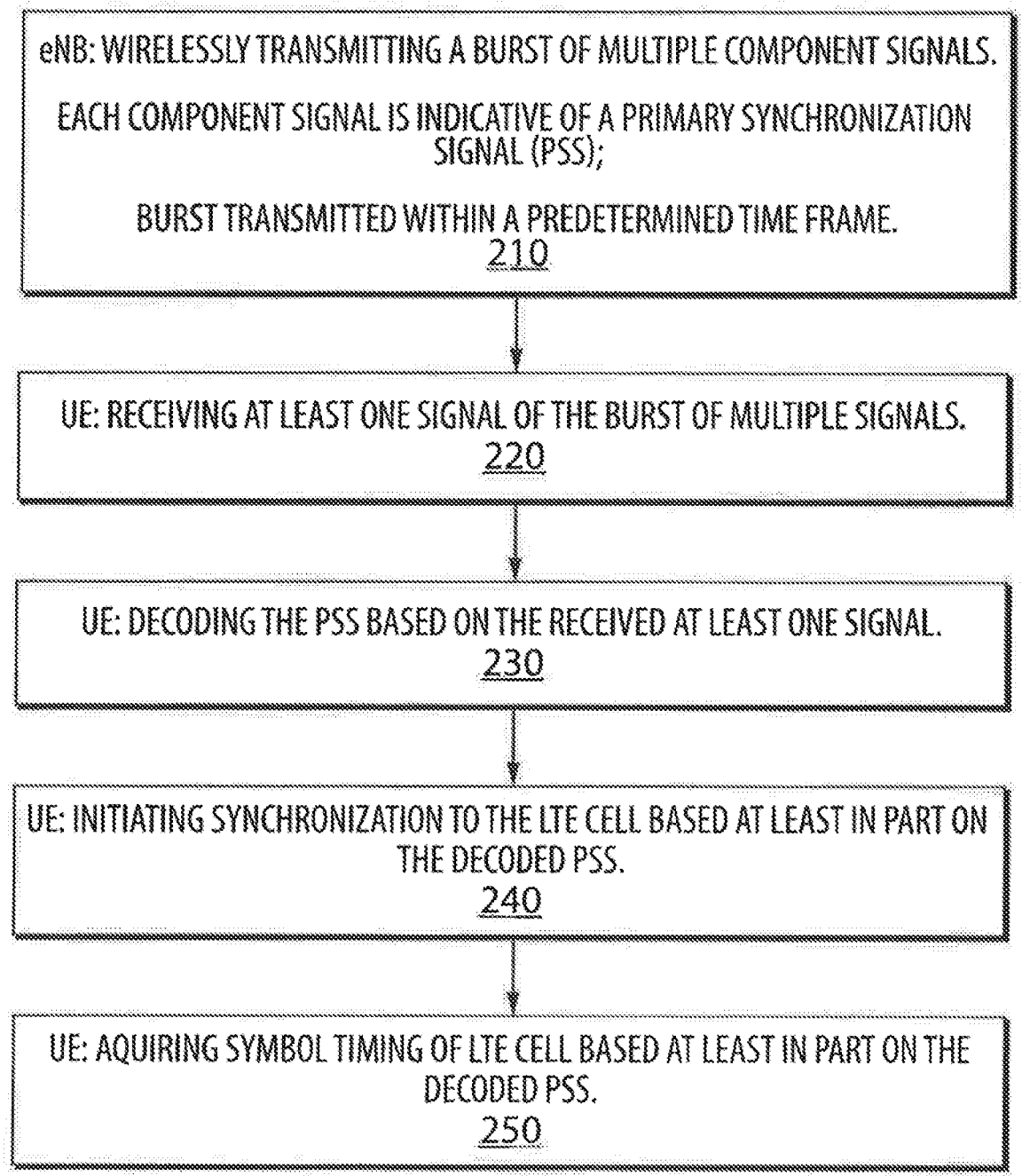
FIG. 3 illustrates a method for facilitating synchronization of a UE to a Long Term Evolution (LTE) cell serviced by an eNB, provided in accordance with embodiments of the invention.

Having reference to FIG. 3, embodiments of the present invention provide for a method for facilitating synchronization of a User Equipment (UE) to a Long Term Evolution (LTE) cell serviced by an evolved NodeB (eNB). The method includes wirelessly transmitting 210, by the eNB, a burst of multiple component signals. Each component signal is indicative of a Primary Synchronization Signal (PSS) and the burst is transmitted within a predetermined time frame. The method further includes receiving 220, by the UE, at least one signal of the burst of multiple signals. The method may further include decoding 230, by the UE, the PSS based on the received at least one signal. The method may further include initiating 240, by the UE, synchronization to the LTE cell based at least in part on the decoded PSS. Additionally or alternatively to initiating synchronization, the method may further comprise acquiring 250 symbol timing of the LTE cell based at least in part on the decoded PSS.

Figure 4:
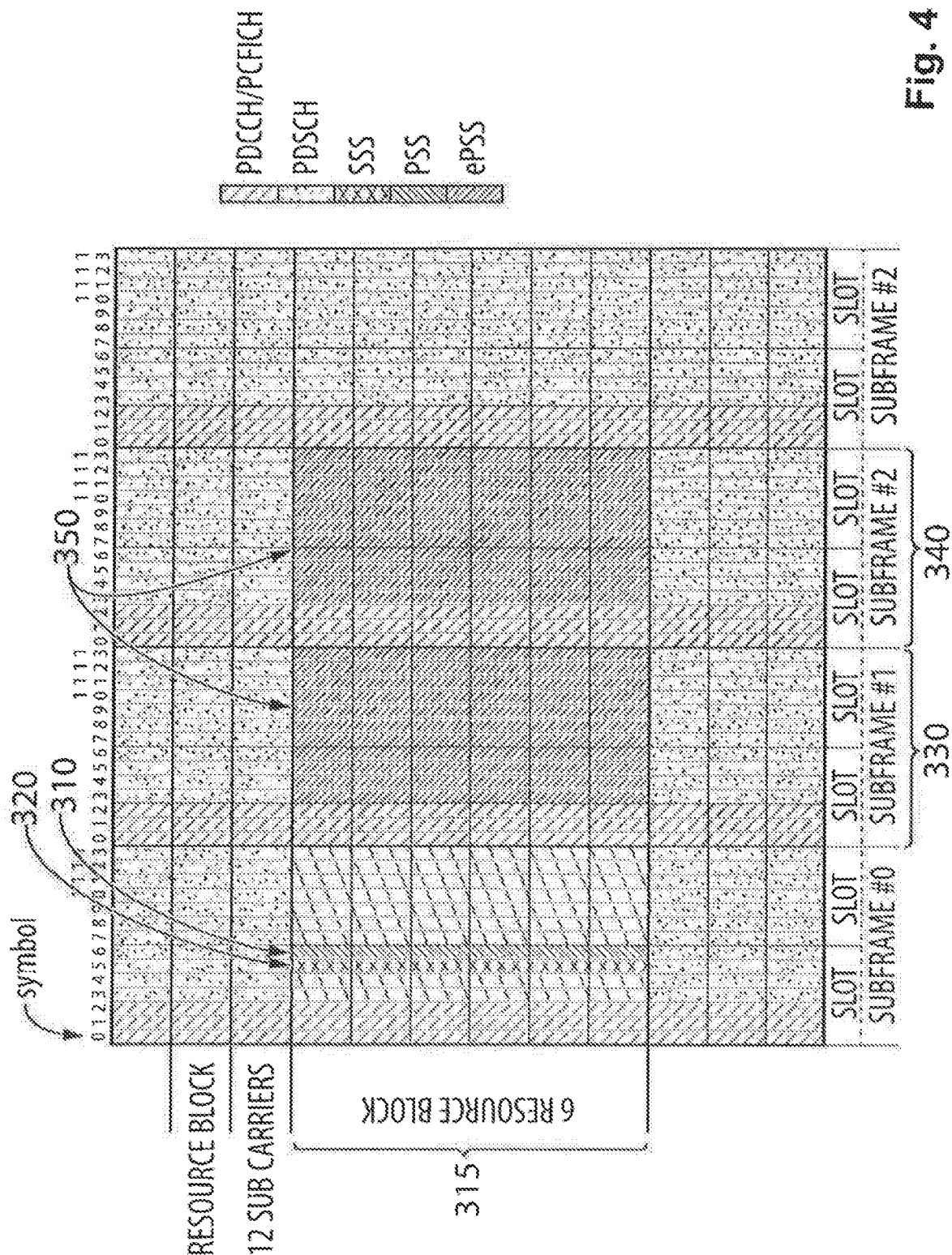
FIG. 4 illustrates portions of an LTE Resource Grid including transmission of a burst of multiple signals for use in UE synchronization, in accordance with embodiments of the present invention.

FIG. 4 illustrates an LTE resource grid provided in accordance with embodiments of the present invention. An LTE resource grid is illustrated in which the PSS 310 is transmitted via a set of simultaneously transmitted symbols and via six contiguous resource blocks in a given frequency band 315. Similarly, the SSS 320 is transmitted via another set of simultaneously transmitted symbols in the same given frequency band 315 prior to transmission of the PSS. In the following two subframes 330, 340, the ePSS 350 is transmitted (via the same given frequency band 315 in the present example). As such, the ePSS may be transmitted using the center six resource blocks of two subframes, such as the two subframes following the subframe in which the PSS and SSS are transmitted. The ePSS may include multiple copies of the component signal, each component signal being conveyed by a number of contiguous slots of a given resource block.

It is considered that, when the component signals are transmitted in time rather than in frequency, the same Zadoff-Chu sequence (same root) can be used as both the PSS and the component signals of the ePSS. Legacy UEs are configured to detect the PSS transmitted in frequency, and therefore would not typically interpret the component signals as a Zadoff-Chu sequence. As such, false detection issues are mitigated.

In various embodiments, the component signals are substantially identical to each other, for example each component signal corresponding to a particular Zadoff-Chu or other Constant Amplitude Zero Autocorrelation (CAZAC) sequence which assists in identifying the cell serviced by the eNB transmitting the ePSS. The component signals may be identical to the existing PSS, which may also be transmitted for backward compatibility.

It is noted that, in various embodiments of the present invention, synchronization generally corresponds to downlink synchronization, rather than uplink synchronization.

As noted above, the ePSS may comprise a burst of component signals, each corresponding to a copy of a PSS. As such, the time required by a UE in low Signal to Noise Ratio (SNR) conditions to receive a sufficient number of copies of the PSS for decoding may be reduced. Further, the UE may not need to remain in a signal-receptive state for a long period of time to receive this sufficient number of copies, and hence energy consumption may also be reduced. For example, several component signals may be sent per subframe. Further, several contiguous or closely-spaced subframes may be used to transmit component signals. In some example embodiments, each of multiple subframes may be used to convey up to 12 component signals each.

In various embodiments, the component signals of the ePSS are Zadoff-Chu type signals, similarly to the currently standard PSS. However, whereas the currently standard PSS utilizes only three of the possible roots of a length-63 Zadoff-Chu sequence, the component signals may utilize roots other than the three roots currently in use. Roots currently in use are roots 25, 29 and 34. It is considered herein that the length-63 Zadoff-Chu sequence may have at least 36 possible roots including these roots. Each eNB in a given region may use a different root. Further, two different eNBs may be inhibited from using the same root unless they are sufficiently far from one another. This may allow for a UE to more reliably identify an eNB.

As noted above, the ePSS is configured to include multiple copies of the existing PSS. This is considered herein to be a convenient choice since LTE eNBs are already configured to generate the PSS and LTE UEs are already configured for detecting the PSS. As such, accommodating the technology disclosed herein may require only limited changes to current LTE systems.

In various embodiments, a UE may be configured to decode the PSS by accumulating plural copies thereof, for example corresponding to plural component signals of the ePSS. The UE may use a differential autocorrelation or similar process to decode the PSS based on the plural copies. Decoding based on plural copies may facilitate coverage in marginal signal conditions, since signal strength may be improved by a form of repetition coding.

In various embodiments, the ePSS includes several copies of the Zadoff-Chu sequences indicative of the PSS, i.e. component signals, thereby facilitating reliable detection of the underlying PSS at relatively low SNRs. In some embodiments, the ePSS includes greater than 10 component signals. In some embodiments, the ePSS includes about 20 component signals. In some embodiments, the ePSS includes about 40 component signals.

In accordance with an aspect of the present invention, there is provided a method for facilitating synchronization of a User Equipment (UE) to a Long Term Evolution (LTE) cell serviced by an evolved NodeB (eNB). The method includes wirelessly transmitting, by the eNB, an ePSS corresponding to a burst of multiple component signals. Each component signal is indicative of a Primary Synchronization Signal (PSS). The burst of multiple signals is transmitted within a predetermined time frame. The method may further include receiving, by the UE, at least one signal of the burst of multiple signals. The method may further include decoding, by the UE, the PSS based on the received at least one signal. The method may further include performing, by the UE, further actions related to synchronization to the LTE cell based at least in part on the decoded PSS.

In accordance with another aspect of the present invention, there is provided a system for facilitating synchronization in a Long Term Evolution (LTE) cell. The system includes an evolved NodeB (eNB) and at least one UE. The eNB is configured to wirelessly transmit a burst of multiple signals. Each of the multiple signals is indicative of a Primary Synchronization Signal (PSS). The burst of multiple signals is transmitted within a predetermined time frame. The UE is configured to receive at least one signal of the burst of multiple signals. The UE is further configured to decode the PSS based on the received at least one signal. The UE may further be configured to perform further actions related to synchronization to the LTE cell based at least in part on the decoded PSS.

In some embodiments, the UE may be configured to perform symbol timing acquisition based on the received at least one signal. The symbol timing acquisition may correspond to reacquisition or recovery of symbol timing following a loss of timing synchronization, for example. The symbol timing acquisition may be performed as part of, in addition to, or alternatively to, the synchronization to the LTE cell.

In embodiments of the present invention, symbol timing acquisition and synchronization to a cell are both examples of adjusting operation of the UE based on the ePSS.

Figure 5:
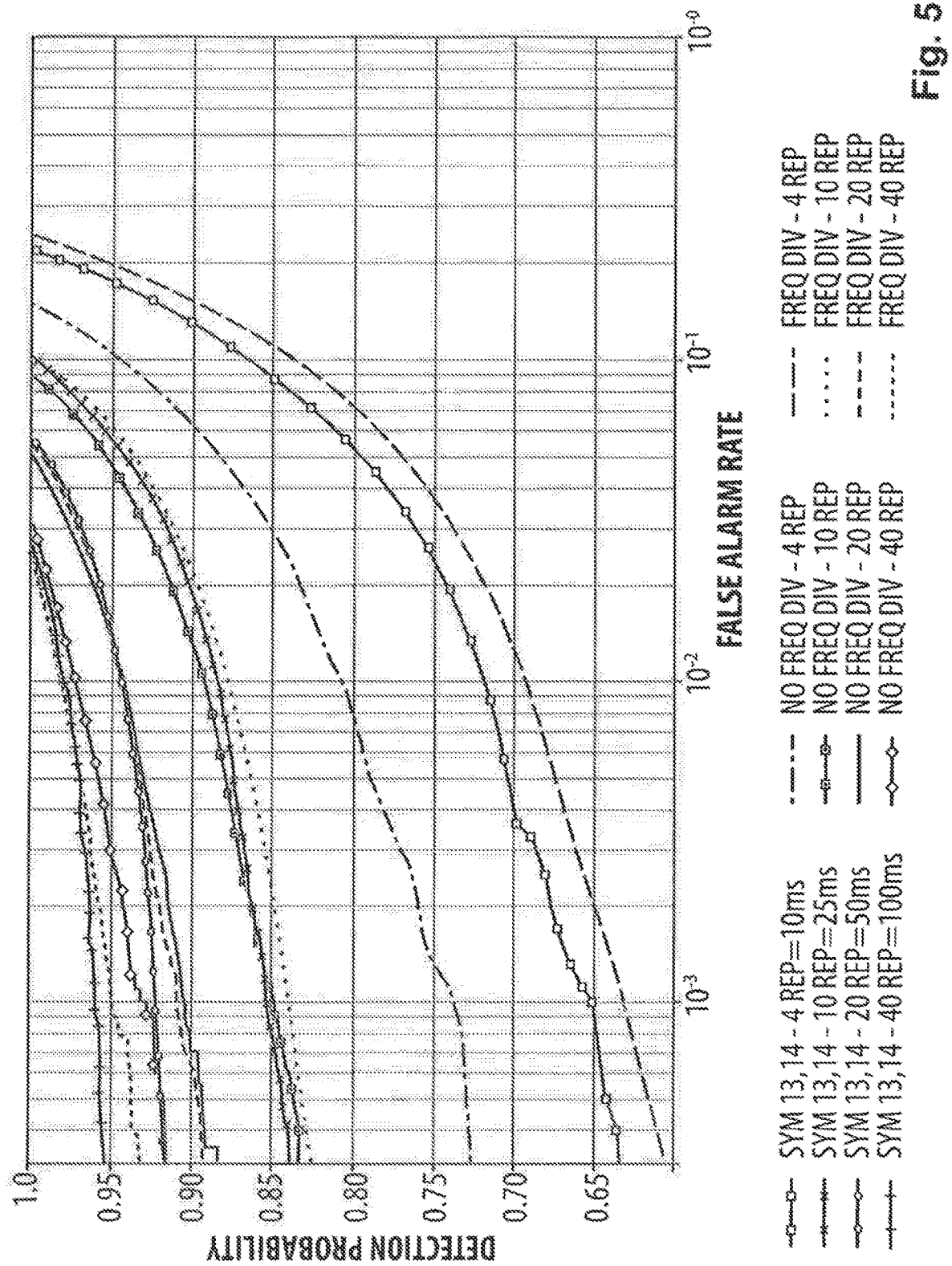
FIG. 5 illustrates simulation results corresponding to detection of the Primary Synchronization Signal (PSS), in accordance with embodiments of the present invention.

FIG. 5 illustrates simulation results showing the probability of detection and false detection of a PSS as derived from plural component signals of an ePSS communicated in accordance with various embodiments of the present invention. Various scenarios corresponding to the ePSS including 4, 10, 20 and 40 component signals ("reps") are illustrated. Scenarios under which frequency division is or is not employed are also illustrated. The Detection Probability corresponds to the probability that the PSS is successfully detected and decoded by the UE based on the multiple component signals. The False Alarm Rate corresponds to the probability that a PSS is erroneously detected, for example due to incorrect detection of a PSS due to errors. For example, a false detection may occur because of errors that make a PSS look like a match for the expected signal. The SNR value in the simulation is about −14.2 dB. The simulation results indicate that an ePSS including about 20 component signals may be sufficient for providing about a 95% PSS detection rate, with adequately low false alarm rate.

In various embodiments, the locations in time and frequency of the ePSS and/or its component signals may need to be known a priori by the UEs, particularly when the ePSS is not scheduled via the PDCCH. However, the location is not necessarily required to be in the center six PRBs. In some embodiments, the ePSS location, such as a specification of the PRBs used to carry the ePSS, may be defined as part of the LTE specification. In other embodiments, to facilitate further resource optimization, the ePSS location may be variable and communicated via an appropriate System Information Block (SIB) transmitted periodically by the eNB. In yet other embodiments, the ePSS location may be transmitted to UEs via higher layer signalling such as Radio Resource Control (RRC) or Non-Access Stratum (NAS) signalling layers.

It is noted that, in current LTE implementations, a PSS signal (and hence also a component signal of the ePSS) requires about 63 Resource Elements (RE), whereas one Physical Resource Block (PRB) in the Physical Downlink Shared Channel (PDSCH) has about 132 REs, although this may vary depending on the current size of the Physical Downlink Control Channel (PDCCH). As such, about two copies of a component signal of the ePSS can be conveyed via the 132 REs of a PRB in the Physical Downlink Shared Channel (PDSCH).

Figure 6:
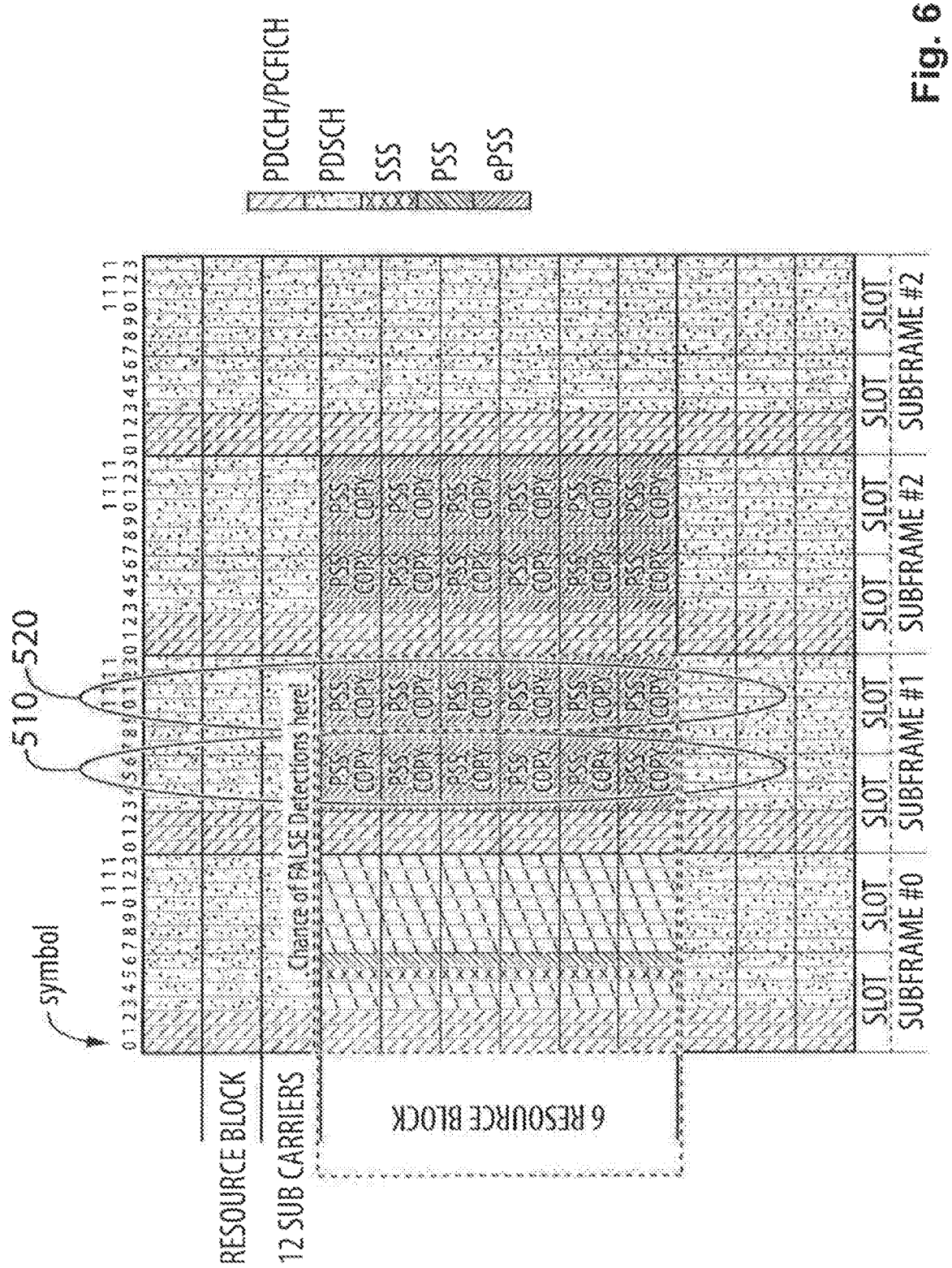
FIG. 6 illustrates portions of an LTE Resource Grid including transmission of a burst of multiple signals for use in UE synchronization, in accordance with embodiments of the present invention.

However, in some embodiments it is considered that a repetition in time of the component signals of the ePSS may trigger a false detection, as illustrated in FIG. 6. More specifically, if a UE is correlating on a strong signal in a window covering more than one PSS copy it will see a fairly strong correlation at positions offset either side of the correct time alignment. For example, if there are two copies that are the same, one after another, there will be at least a 50% match for positions offset one PSS either side of the 100%. In noisy conditions where there are errors, the best match may therefore be at any of three possible timing positions. In various embodiments, to mitigate the chance of a false detection, repetitions in time may be avoided by adequate filling of the resource blocks used to convey the ePSS. Additionally or alternatively, the ePSS may comprise different component signals in different subframes, each of the different component signals corresponding to a different root M of the Zadoff-Chu sequence for example as specified in Equation (1). This may provide for a strong correlation at the appropriate time.

In some embodiments, the example presented with respect to FIG. 6 may have a ramp up and down of possibly good match probabilities from the various levels of overlap with the sample window.

Figure 7:
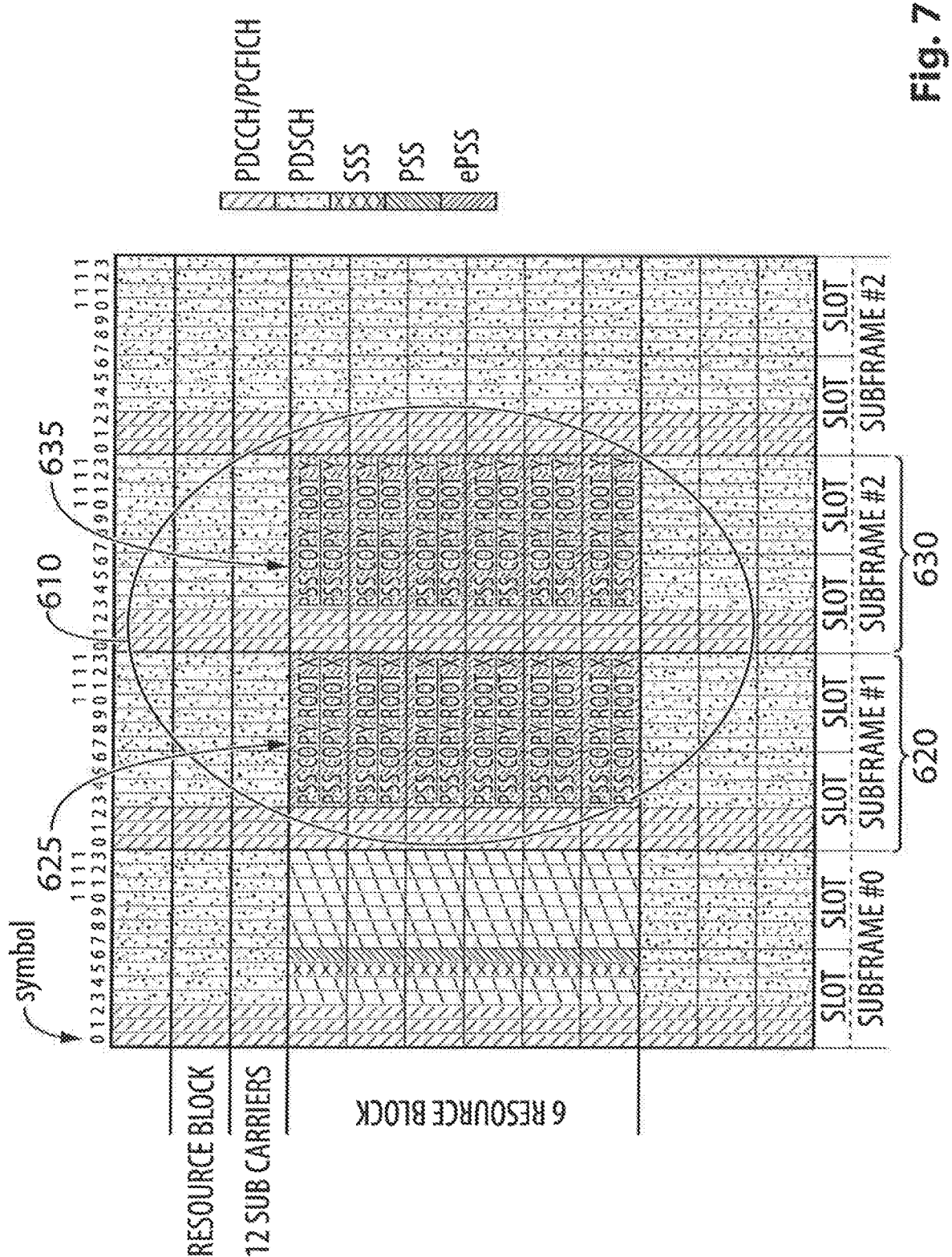
FIG. 7 illustrates portions of an LTE Resource Grid including transmission of a burst of multiple signals for use in UE synchronization, in accordance with other embodiments of the present invention.

An example configuration is illustrated in FIG. 7, in which the ePSS 610 is conveyed via two adjacent subframes 620, 630, such that the component signals 625 of the ePSS falling within the first subframe 620 correspond to a first root X of the Zadoff-Chu sequence and the component signals 635 of the ePSS falling within the second subframe 630 correspond to a second, different root Y of the Zadoff-Chu sequence. In various embodiments, correct alignment of a window across the two subframes, 1 and 2, is expected to correspond to the only time that generates a good correlation. In this example the PSS copy roots are duplicated in frequency across two slots. In contrast, in the example corresponding to FIG. 6, the PSS copy roots are duplicated in time in the same two slots and the two subframes. As illustrated in FIG. 7, the component signals 625 include two identical copies of the PSS copy root X, each in 6 of the 12 frequencies available in a Resource Block.

In some embodiments, rather than transmitting two copies of a component signal within a resource block, the component signal may correspond to a root of a longer CAZAC sequence, for example a Zadoff-Chu sequence of length 132, given by:

$$ZC^{132}_M(n)=\exp[-j\pi Mn(n+1)/132], n=0,1,\ldots,132 \quad (2)$$

A longer sequence may be configured such that it spans substantially all symbols across a subframe, while using one subcarrier, for example.

Energy Consumption Considerations

Some embodiments of the present invention are configured to address an issue of potentially excessive energy used by UEs in DRX mode to decode the PSS when the UEs are experiencing relatively low SNR conditions. For example, it is noted that, in current LTE implementations, before the UE can decode the PDCCH, the UE typically needs to acquire appropriate timing synchronization with the eNB. Acquisition may include: Carrier frequency offset (CFO) estimation; Symbol timing estimation; Sub-frame timing estimation; Cell-ID verification; and Frame timing estimation.

Figure 8:
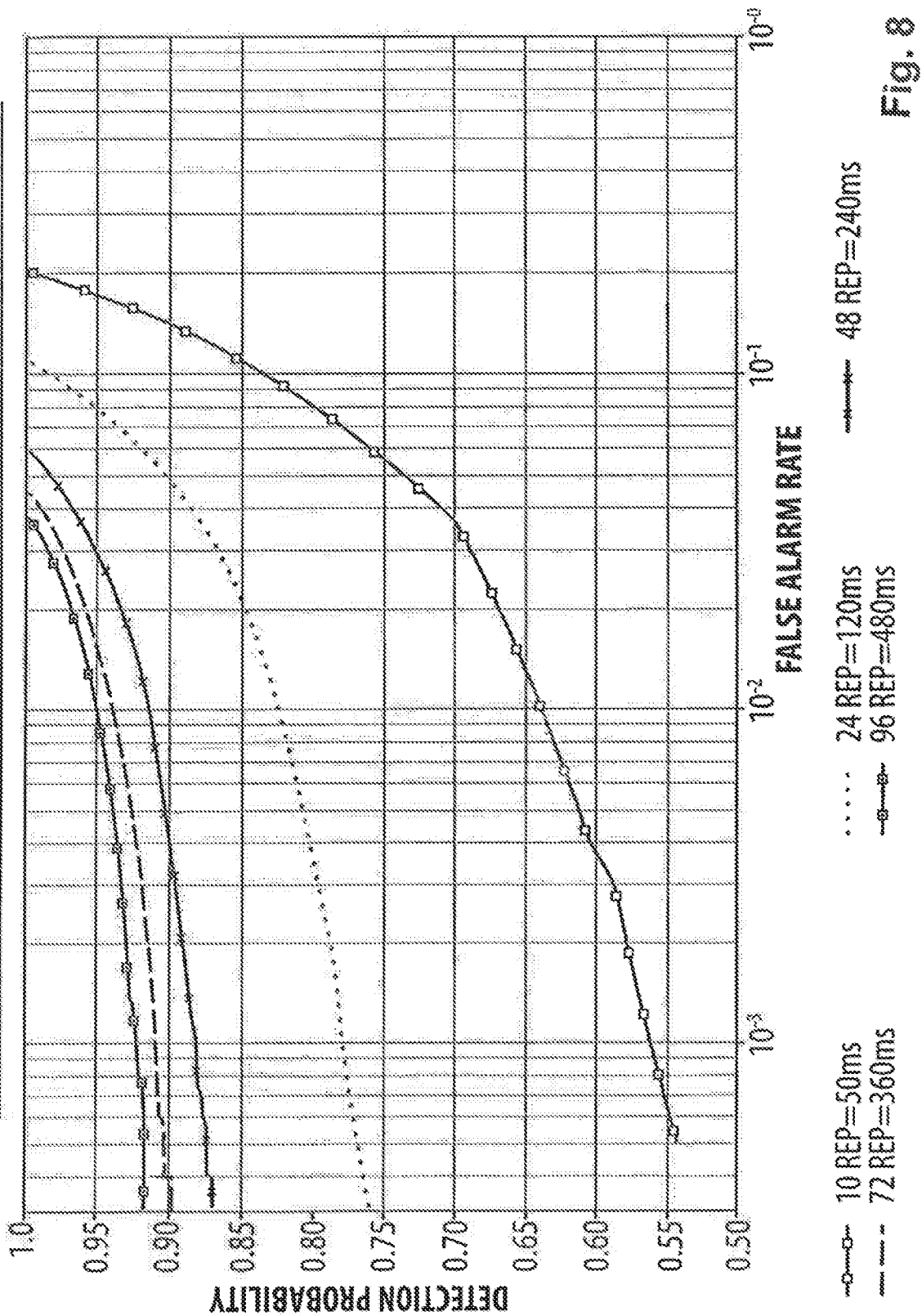
FIG. 8 illustrates simulation results corresponding to detection of the PSS, in accordance with embodiments of the present invention and/or the prior art.

In current LTE implementations, CFO and symbol timing acquisition algorithms typically rely on the cyclic prefix. Even in poor Signal-to-Interference-Plus Noise Ratio (SINR) conditions such algorithms are considered to perform well and use relatively little power. In addition, frame timing is typically not needed as long as the UE's crystal clock (XTAL) tolerance (PPM) doesn't drift by more than +/−5 ms each DRX sleep cycle. Sub-frame timing and cell ID verification may be accomplished by the detection of the PSS and SSS (correlation with the previously obtained PSS and SSS). In some scenarios, PSS detection at low SNRs of −14.2 dB can take up to about 300 ms for 90% detection probability and about 100 ms for 50% detection probability. FIG. 8 illustrates simulation results showing the probability of detection and false detection of a PSS as derived from plural copies of the PSS, whether received over time or within a burst corresponding to the ePSS. Various scenarios corresponding to the number of copies of the PSS being 10, 24, 48, 72 and 96 are illustrated. The time in milliseconds corresponds to the time taken for accumulating this number of copies in existing LTE implementations without use of the burst ePSS. The Detection Probability corresponds to the probability that the PSS is successfully detected and decoded by the UE based on the multiple copies of the PSS. The False Alarm Rate corresponds to the probability that a PSS is erroneously detected, for example due to detection of a PSS of a neighbouring cell. In various scenarios, PSS detection may equate to taking 90% to 67% of the power used by the UE when in idle DRX. In some embodiments, the possibility of false PSS detection can be mitigated by also receiving the SSS. It is considered that performance of combined PSS and SSS detection may potentially be quicker since this is a longer sequence. For example, as described elsewhere herein, more than 3 and up to 36 roots of Equation (1) may be utilized in the ePSS to avoid false detection from adjacent cells. This can make it unnecessary to receive the SSS if the ePSS can be relied upon to indicate that a UE is still camped on the same cell.

In various embodiments of the present invention, the number of PSS copies required by the UE for a successful decode may be substantially the same whether a legacy method of broadcasting PSS is used or whether the ePSS approach as described herein is used. However, when the ePSS is sent in a relatively dense burst in the PSDCH, the time required to communicate this number of PSS copies, and hence the acquisition time, can be decreased. For example, in some embodiments, using the ePSS method, 24 copies of the PSS can be sent in 2 subframes. This assumes 6 PRB, the maximum for the low complexity Rel. 13 UE. In contrast, a legacy method of broadcasting PSS may require 100 SF to transmit 20 copies of the PSS.

As noted above, since the time required for a UE to successfully acquire and decode a PSS is reduced, total energy required for the task may also be reduced. However, the power saving in the above example may not simply be a ratio of 2/100, since there are still several other steps that need to be performed and overhead to account for. A spreadsheet power model was created in support of the present invention for analysis of the decode energy considerations. This model showed that the ePSS technique can extend battery life by between 9 times and 3 times, relative to legacy methods and at low SNR (−14.2 dB). This range may vary depending on various factors, such as legacy paging opportunity decode time at low SNRs (5 ms-20 ms) and overheads such as warm-up time (e.g. turn radio on, code from Flash to RAM, Carrier Frequency Offset (CFO) estimation time, and Symbol timing estimation). The lower the overhead becomes the larger the improvement may become (as a percentage). It is also considered that energy savings associated with the present invention may be less for UEs which are in a relatively good coverage.

In various embodiments, the ePSS may be transmitted in less than all Paging Occasions (PO) and/or subframes (SF). It is considered that transmitting the ePSS at every PO may consume a large amount of network resources. To reduce resource consumption, PO locations may be assigned for UEs which are at low SNR close after the ePSS is sent. Since the UEs at low SNR typically constitute a subset of all UEs in a cell, it is considered that, in various embodiments, the ePSS doesn't need to be sent in every 10 ms Frame. Rather, in one embodiment, the ePSS may be transmitted every k Frames, where k=1/p and p is the proportion of UEs experiencing a "low" SNR, that is an SNR below a threshold value. Thus, assuming 10% of UE are at low SNR, the ePSS only need to be sent every 100 ms.

Figure 9:
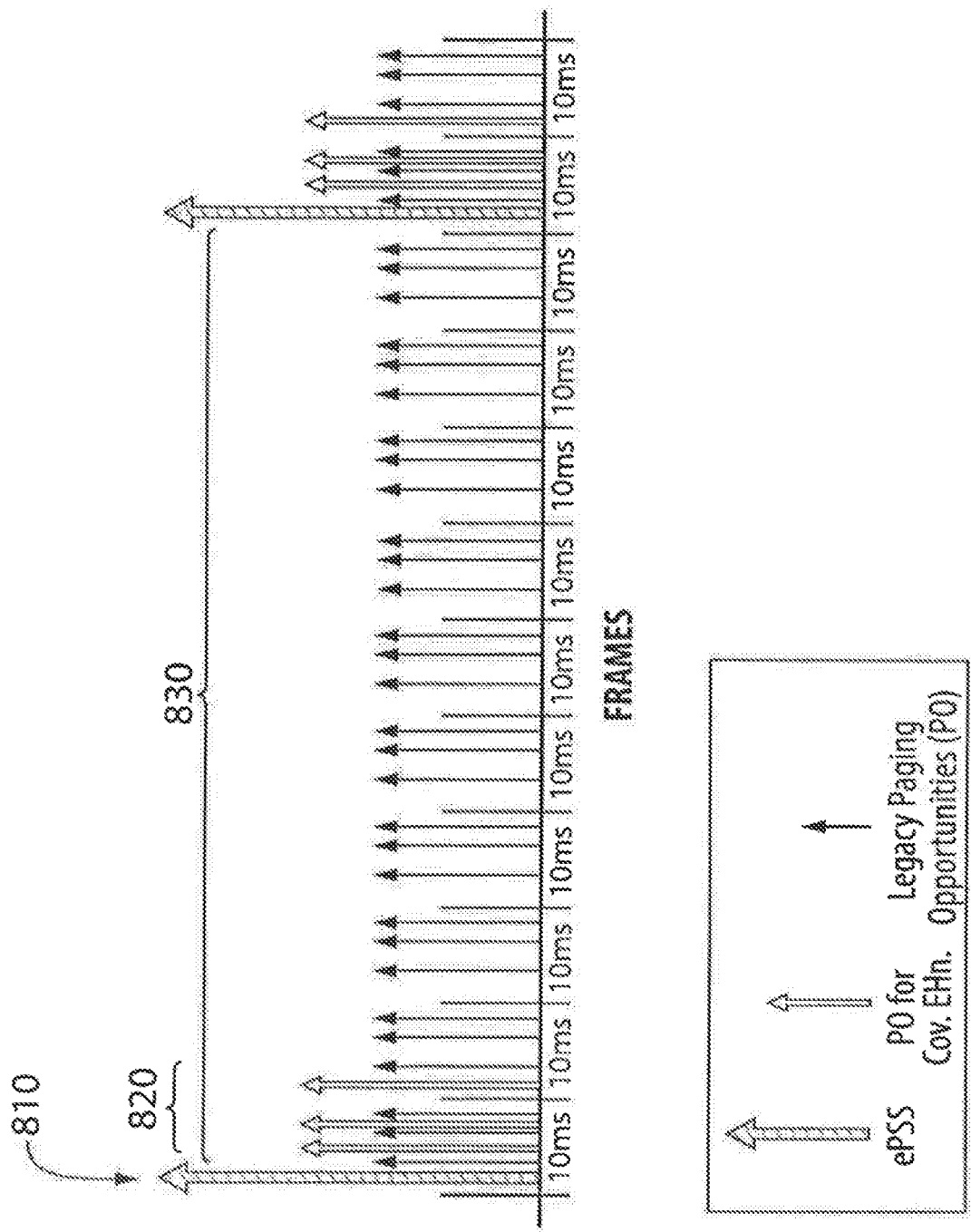
FIG. 9 illustrates an example of legacy and coverage-enhanced paging, in accordance with embodiments of the present invention.

It is further contemplated that, in various embodiments, legacy UEs may potentially be paged the majority of the time via the PDCCH, and UEs in Coverage Enhancement (CE) mode may be paged using a coverage enhanced form of ePDCCH. As such, the PDCCH capacity may remain balanced. FIG. 9 illustrates such a configuration, including Coverage Enhancement Paging Opportunities 820 occurring up to about 10 ms after the ePSS 810, and legacy Paging Opportunities 830 occurring at other times spread out between instances of the ePSS.

The proportion of network resources used by embodiments of the present invention to support the ePSS is given below for various example scenarios. The ePSS in these examples corresponds to about 12 PRBs (about 24 repeats) every 100 ms.

For a 1.4 MHz system bandwidth (for example used in association with Low-Cost or Limited-Capability UEs), the network resource usage is about 12/(6*100) =2%.

For a 5 MHz system bandwidth, the network resource usage is about 12/(25*100)=0.5%.

For a 10 MHz system bandwidth, the network resource usage is about 12/(50*100)=0.24%

For a 20 MHz system bandwidth, the network resource usage is about 12/(100*100)=0.12%.

In some embodiments, at a relatively small increase in UE power consumption, a single ePSS may be used to synchronize UEs with POs that span longer than 10 ms. In some such embodiments, after the UE detects the ePSS it may be required to stay awake or go to sleep with a relatively high accuracy crystal-driven clock until its PO occurs. Sleeping may save more power, however the crystal accuracy needs to be better than ½ of a symbol to avoid loss of SF timing during sleep. For example a crystal accuracy of at least (½)*(1/14)ms=36 microseconds may be required. A relatively inexpensive, well-trained XTAL may have an accuracy of about 10 PPM which allows a sleep time of 3.6 seconds before symbol timing is lost. For such a crystal clock accuracy, the ePSS may be transmitted periodically with a period of up to 3.6 seconds.

In some embodiments, as mentioned above, the UE may be configured to perform symbol timing acquisition, such as first-time acquisition or symbol timing reacquisition or recovery, based on the received signal. Symbol timing recovery may be performed when the UE loses accurate symbol timing synchronization with the wireless communication system, for example upon waking up from an extended period of sleep, in response to a clock drift condition which indicates symbol timing has potentially been lost.

Conventionally, in OFDM based systems, the UEs reacquire the timing using cyclic prefix (CP) autocorrelation and/or by detecting the synchronization reference signals which are transmitted periodically by the base-station. The reacquisition time is inversely proportional to the Signal-to-Noise Ratio (SNR), which may be significant in marginal signal conditions. This is a particular problem in the new LTE Enhanced Coverage operation. Long reacquisition times may cause higher UE power consumption and delay upon wake-up.

In various embodiments, the UE is configured to acquire timing based at least partially on the ePSS. For example, a plurality of copies of the PSS as included in a burst corresponding to the ePSS may be decoded to determine the system's symbol timing.

In some embodiments, the UE can obtain the 5 ms sub-frame timing by detecting the PSS, but it will not know whether it is in the first half of the radio frame (corresponding to the detection of the PSS at sub-frame 0) or the second half (corresponding to the detection of the PSS at sub-frame 5). This ambiguity can be resolved by detecting the SSS which is transmitted one symbol before the PSS. The SSS on sub-frame 0 is different from the one on sub-frame 5, and the UE can exactly determine the subframe number depending on the SSS pattern it detects.

Frame Timing and DRX Considerations

Some embodiments of the present invention are configured to address an issue related to UE clock drift, UE synchronization loss and/or frame timing when a long DRX time interval is used by a UE. For example, when a UE's DRX interval is sufficiently long, the UE's internal crystal clock (XTAL) timing accuracy may degrade to the point that a clock synchronization error range exceeding +/−5 ms is possible. For a 10 ppm XTAL, this occurs after 8.3 minutes of sleep. If such a timing accuracy condition occurs, it may be desirable to re-acquire the Physical Broadcast Channel (PBCH). Re-acquiring the PBCH at low SINRs is considered to take a relatively long time, for example the time required for $99^{th}$ percentile detection may exceed 1000 ms, as set forth in the 3GPP document numbered R1-144601 and entitled "3GPP TSG RAN WG1 Meeting #79, Coverage Enhancement PBCH Simulation Results and Proposals," Sierra Wireless, San Francisco, USA, 17-21 Nov. 2014. Such a re-acquisition of the PBCH may also consume significant battery energy.

As noted above, in various embodiments of the present invention, the ePSS is sent less frequently than every 10 ms, for example every 100 ms, and further the ePSS is sent at a System Frame Number (SFN) which may be known a priori to a UE. As such, it is considered that the timing drift due to an inexpensive crystal clock of the UE may be greater than, e.g. 100 ms (rather than 10 ms) before frame synchronization is lost. As an example, for a UE employing a crystal clock having an accuracy of about 10 PPM, sleep time may up to about 83 minutes before a loss of Frame timing occurs. As such, a relatively long potential sleep time may be provided for in some embodiments, when compared to prior art capabilities.

SSS Detection Considerations

Some embodiments of the present invention are configured to address an issue related to the need for a UE to detect the Secondary Synchronization Signal (SSS), for example following detection of the PSS. As will be readily understood by a worker skilled in the art, detection of the SSS is typically required for full identification of the cell-ID. Further, decoding of the SSS typically requires information obtained from decoding of the PSS. It is also considered that the PSS on its own may potentially not provide sufficient information on its own to reliably confirm SF timing or Cell ID. This is due to a non-negligible probability that a UE will mistakenly decode a neighbouring eNB's PSS rather than the PSS of the eNB of the cell on which it is camped. Because only three PSS signal are used, one for each sector, a UE may potentially receive the PSS of a neighbouring eNB. This is particularly a concern for UEs in Coverage Enhancement (CE) mode. Further, it is considered that the SSS detection performance may be undesirably low due for example to the poor auto-correlation properties of the SSS.

Various embodiments of the present invention may be configured to facilitate synchronization of a UE with a desired eNB by assigning different eNBs to use different ones of the unused Roots (i.e. roots other than Roots 25, 29, 34 that are co-prime with the sequence length) of Equation (1) for its PSS, and such that a predetermined amount of spacing between eNBs using the same root is used. This is in contrast to current LTE implementations which utilize only three roots. Each eNB may be configured to use, for the ePSS thereof, one or more selected roots of Equation (1) such that these selected roots are not re-used by another eNB within a predetermined distance. That is, the spatial re-use pattern of roots may be configured to avoid nearby eNBs utilizing the same roots. As such, a UE may verify that it is still decoding the same cell when the observed root as derived from the ePSS is unchanged. As such, the UE may not be required to decode the SSS in order to verify which cell is being decoded.

Figure 10:
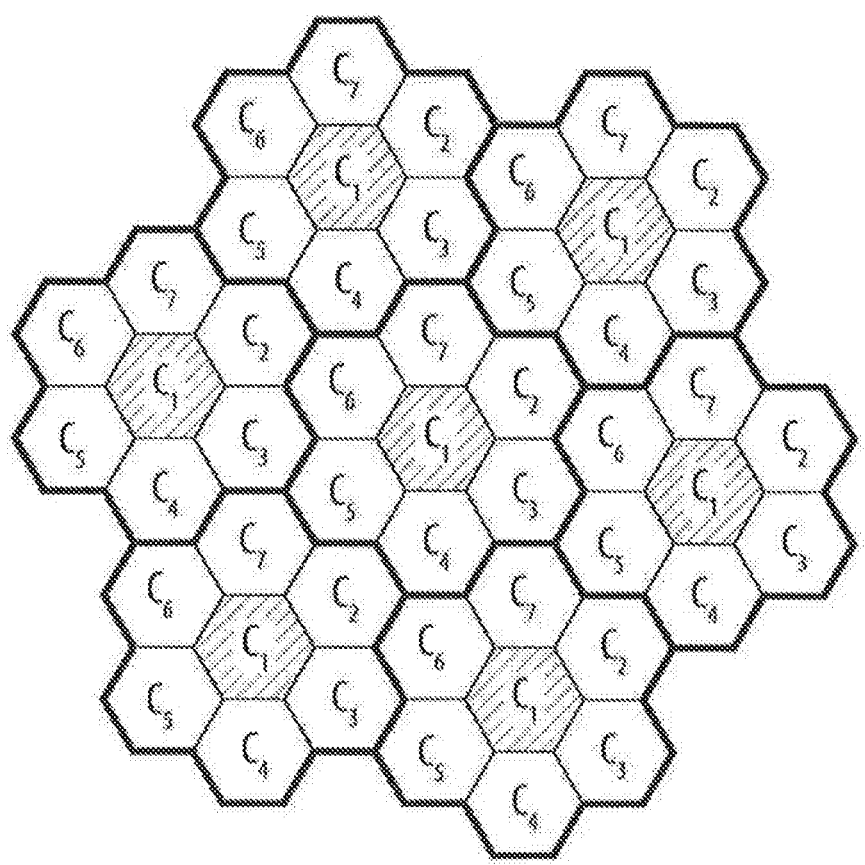
FIG. 10 illustrates a cell pattern of re-use of different roots of Zadoff-Chu sequences for the ePSS, in accordance with embodiments of the present invention.

In some embodiments, when all viable roots of Equation (1) are in use, and/or when all combinations of patterns of these roots are in use, there is expected to be relatively little chance the UE would accidentally decode a neighbour ePSS. In some embodiments, a root re-use pattern of seven is utilized as illustrated in FIG. 10. For example, cells with same labels $c_i$ (1=1, 2, . . . 7) may utilize the same roots for ePSS transmission, while cells with different labels may utilize different roots.

In some embodiments, less than all but more than three of the roots of Equation (1) may be used, thereby providing more than three PSS signals for identifying cells and reducing the need to rely on the SSS for cell identification. For example, in one embodiment, seven different roots of Equation (1) are used to provide seven different PSS signals rather than three as used currently.

Figure 11:
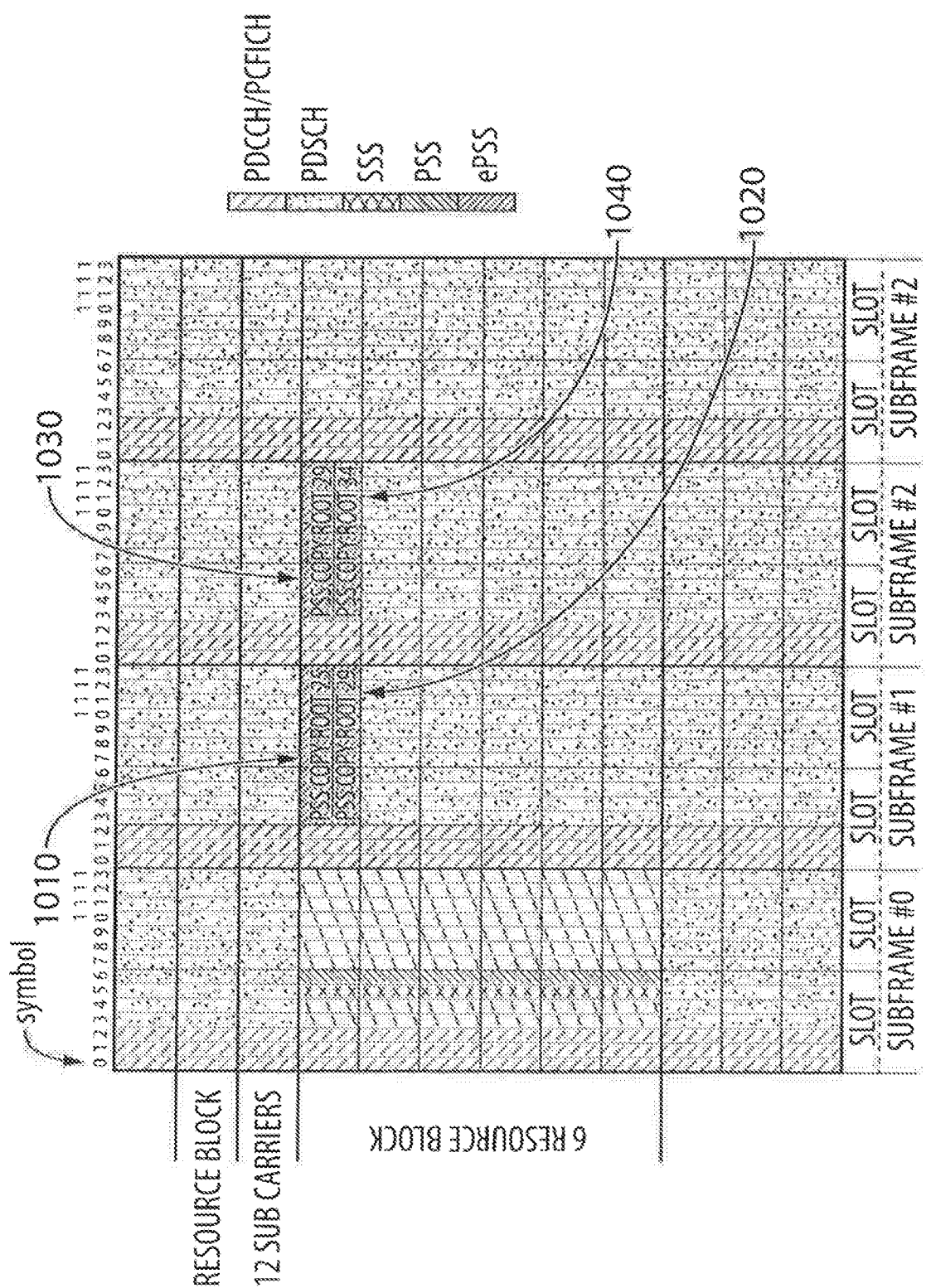
FIG. 11 illustrates portions of an LTE Resource Grid including transmission of a burst of multiple signals for use in UE synchronization, in accordance with other embodiments of the present invention.

In some embodiments, rather than using roots other than the three roots of Equation (1) already in use, i.e. roots 25, 29 and 34, the ePSS may be formed from patterns of these three roots. As such, UE reconfiguration may be reduced, since sequences corresponding to additional roots need not be stored in UE memory. For example, the ePSS may comprise unmatched pairs of the three roots mentioned above, such that a first pair of the roots is transmitted in a first subframe on adjacent frequencies, and a second pair of the roots is transmitted in the following subframe. It is contemplated that there may be 18 different combinations of roots in such a configuration that do not repeat the same root on the same frequency. Avoidance of repeated roots may be desired since, if a root is repeated, there may be a 50% chance of the UE making a correlation match for that frequency for one subframe offset either side of the correct timing, which may result in a false detection of the time. In some embodiments, the above configuration with 18 combinations of roots may allow a reuse pattern that may likely avoid the UE incorrectly detecting an ePSS from a neighbouring eNB. In various embodiments, the pattern of roots may be known a priori to the UE, for example via communication of the pattern to the UE using a broadcasted SIB or higher-layer signalling means. FIG. 11 illustrates an example of this configuration, in which a first subframe includes two component signals 1010, 1020 of the ePSS corresponding to two roots of Equation (1), namely roots 25 and 29, respectively, and in which a second, subsequent subframe includes two component signals 1030, 1040 of the ePSS corresponding to two roots of Equation (1), namely roots 29 and 34, respectively. The four component signals 1010, 1020, 1030, 1040 may be transmitted in time, one after another.

In some embodiments, as the number of Resource Blocks (RBs) and/or the number of roots used for conveying the ePSS increases, the number of different potential combinations of roots used in the ePSS may correspondingly increase. In some embodiments, different frequencies may be used in different cells to convey the ePSS. In some embodiments, different blocks of RBs may be used in different cells to convey the ePSS.

Figure 12:
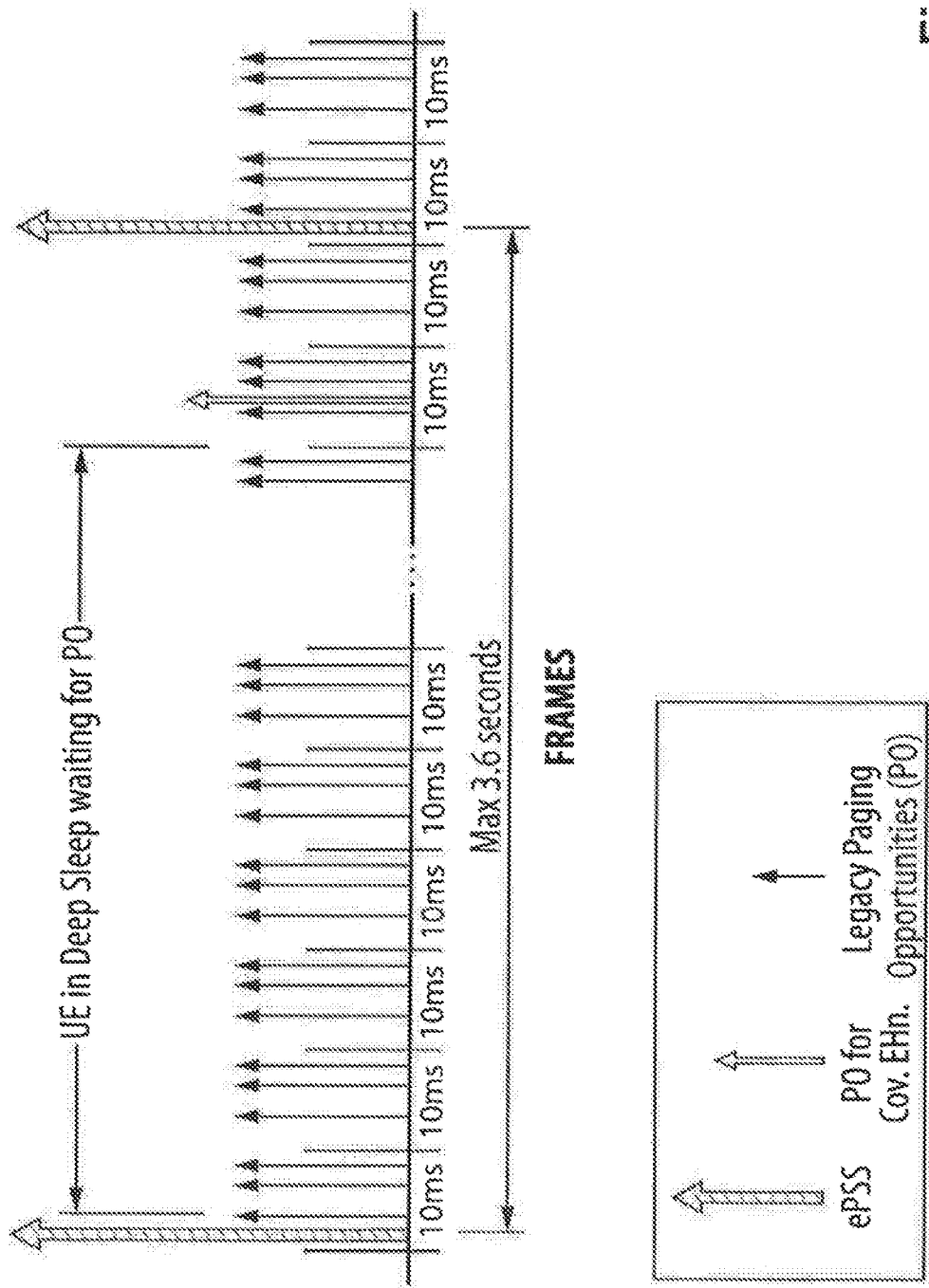
FIG. 12 illustrates ePSS and PO timing with a 3.6 second interval, in accordance with an embodiment of the present invention.

FIG. 12 illustrates ePSS and PO timing with a 3.6 second interval, in accordance with an embodiment of the present invention. In some embodiments, a single ePSS may be used to synchronize UEs with POs that occur greater than 10 ms from the ePSS. To maintain power efficiency, after the UE detects the ePSS, it would go back into the deep sleep mode and then wake-up again just before its PO. For this to work, while the UE is in deep sleep, the clock accuracy needs to make sure the UE doesn't lose SF timing. For example, in one embodiment, the UE could only stay in deep sleep after the ePSS for a maximum of 3.6 seconds, assuming a XTAL accuracy of ±10 PPM. Thus, the ePSS could be sent with a maximum period of 3.6 sec assuming a XTAL accuracy of ±10 PPM. It is observed that, in some embodiments, the ePSS may be sent infrequently with a period up to 3.6 seconds assuming an XTAL accuracy of +/−10 PPM.

ePSS with Paging Indicator (PI)

Some embodiments of the present invention relate to an ePSS with Paging Indicator, as follows. Since decoding the PO may use a fair bit of the power (for example 45%), this could be reduced if the ePSS is used both for SF synchronization and to indicate if a page is going to be sent in its upcoming PO or not. To indicate this, different PSS root sets/combinations can be sent; one root set to indicate when there is a paging coming in the upcoming PO and a different root set to indicate if there is no page coming and thus the UE can go directly to sleep after ePSS decoding without needing to stay awake to try and decode the PO. The amount of power saving will depend on how often a page is being sent in the PO for that UE. As shown in the annex, the ePSS detection performance only degrades slightly when the UE needs to search for two possible root sets so detection time is still about 4 SF times 6 PRBs for 90-95% detection probability at SNR corresponding to 15 dB gain.

Figure 13:
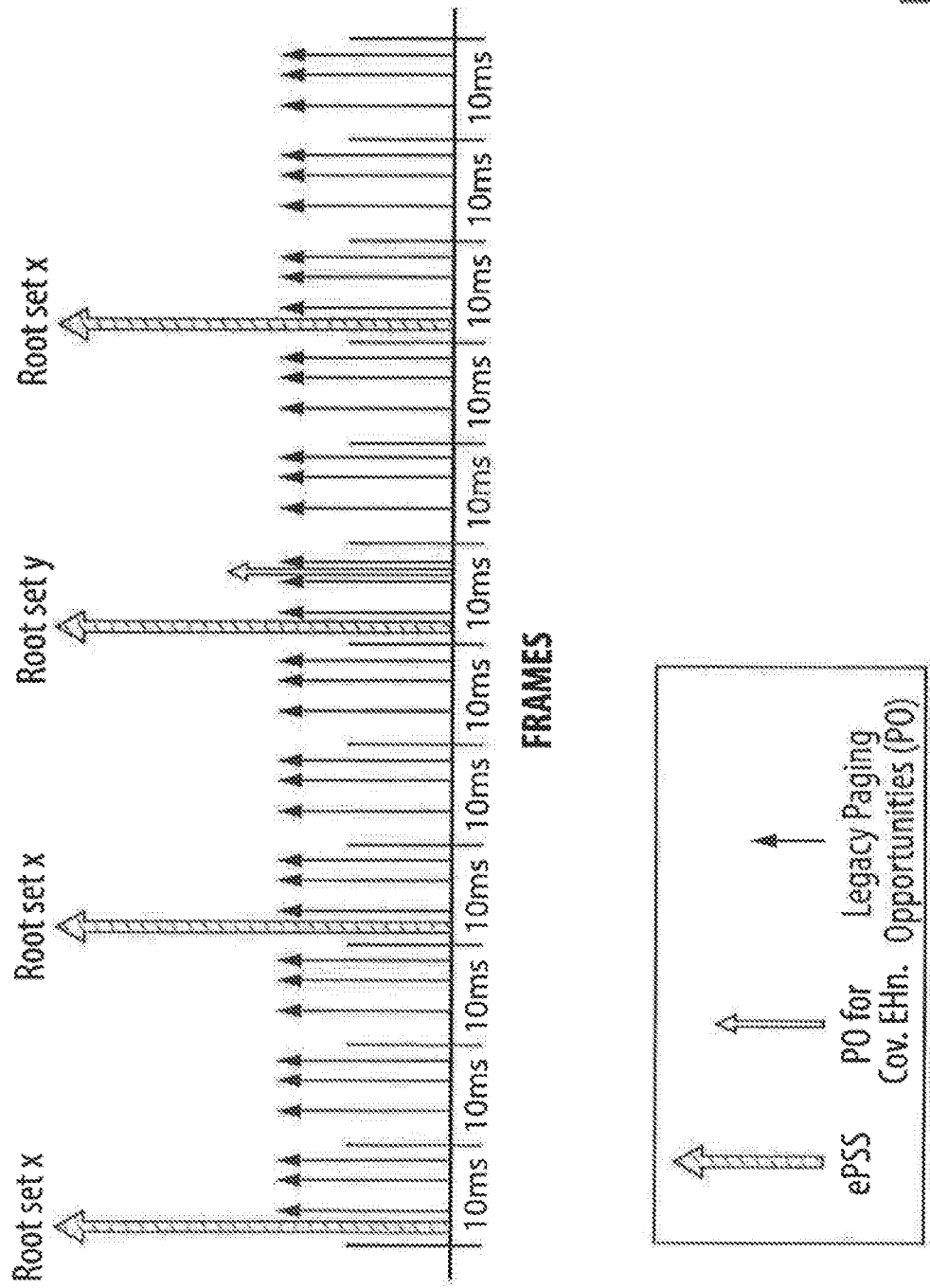
FIG. 13 illustrates ePSS with paging indicator, in accordance with an embodiment of the present invention.

FIG. 13 illustrates ePSS with paging indicator, in accordance with an embodiment of the present invention.

It is observed that, in some embodiments, an ePSS may additionally communicate if a page is going to be sent in the upcoming PO or not.

In some embodiments, assuming that 10% of the time a page is sent at the PO (i.e. so 90% of the time the UE can go directly to sleep after decoding the ePSS), for the "Receive only" use case with the DRX cycle=30 sec, the power consumption usage breaks down as in the TABLE 1.

TABLE 1

|  | Baseline | | ePSS with Paging Ind. | |
| --- | --- | --- | --- | --- |
|  | mWH per Day | % Power Used | mWH per Day | % Power Used |
| Wake from Deep Sleep | 0.4 | 2.5% | 0.4 | 13.9% |
| PSS/SSS Acquisition | 13.8 | 86.3% | 1.6 | 55.5% |
| MIB Acquisition | 0.0 | 0.0% | 0.0 | 0.0% |
| DRX Decode PO | 1.4 | 8.5% | 0.4 | 15.3% |
| Deep Sleep | 0.4 | 2.8% | 0.4 | 15.4% |
| Battery Life (Months) | 10.4 | | 57.8 | |
| % improvement | NA | | 556% | |

It is observed that, in some embodiments, when the ePSS additionally communicates the paging status, the ePSS may reduce battery consumption by >5 times.

Providing Accurate Time Information to UEs

In accordance with some embodiments of the present invention, there is provided a method and system for facilitating provision of accurate time information to UEs that rely on aggregation of multiple receptions of data to adequately receive downlink data. Such UEs may be operating in a Coverage Enhancement mode, for example.

For example, UEs in an LTE system that require aggregation of multiple receptions in order to clearly receive the eNB downlink may not be able to receive the accurate time information contained in System Information Block 16 (SIB16), since the time information changes frequently as time progresses. It is further noted that SIB16 information, like access class barring information, is typically not flagged as having changed in legacy LTE systems, since frequent change is expected.

In some embodiments of the present invention, an SIB may be used to convey accurate time stamp information to UEs. In some embodiments, the SIB may be a new SIB used for servicing UEs such as low-cost, limited capability and/or coverage-enhanced UEs, such as an SIB of this type proposed for Release 13 of the 3GPP LTE specification. A reference to the proposed SIB is as follows: "LS on simultaneous reception requirements and SIBs for MTC UEs," 3GPP TSG RAN WG1 Meeting #79 R1-145416 San Francisco, USA, 17-21 Nov. 2014.

In some embodiments, the new SIB may be configured to include a set of accurate time stamp information, which may be repeated within multiple successive copies of the new SIB. At a time after the information should have been received, another downlink transmission event may be provided and configured to mark the time at which the accurate information should be applied. The marker event may be configured to have high intelligibility for reception in a weak signal environment. The marker event does not necessarily need to convey other information, but rather may be a substantially stand-alone signal. UEs may be configured to employ correlation of the pattern of a known marker transmission to enhance reception success. The time information conveyed by the SIB and triggered by the marker event may be assumed by the UE to be applicable at a known point such as a point in time corresponding to a peak correlation of the received signal with the known marker, as used by the UE to detect the marker event.

In some embodiments, the time mark may be considered to be at a predetermined point in time relative to the marker transmission, such as the beginning, end or at some time during, before or after the marker transmission. In some embodiments, it may be desirable and practical to apply the time marker at a predetermined amount of time after the marker transmission to allow for decoding and verification rather than retroactively applying the time marker to a time earlier that the confirmed reception of the marker.

In various embodiments of the present invention, the ePSS described above may also function as the time marking event. The ePSS may be a viable candidate for this function since it is considered to potentially have characteristics which would make it useful for this purpose. In various embodiments, the timing of the ePSS may be configured in coordination with requirements for providing of the time information in the new SIB.

In various embodiments, low-cost or limited-capability (LC) UEs may correspond to low complexity User Equipment such as those proposed for standardization by the 3rd Generation Partnership Project (3GPP). This category is primarily intended for use in Machine Terminated Communication (MTC) applications in LTE networks. Release 12 of the LTE standard is planned to explicitly accommodate Category 0 UEs that are limited in their capabilities relative to other categories. Release 13 will define another category of LC UEs that will have certain limitations relative to Category 0 UEs, such as communication bandwidth and/or computation limitations.

In various embodiments, simulations such as those identified herein to illustrate aspects of the present invention follow simulation settings as set out in TABLE 2.

TABLE 2

| Parameter | Setting |
| --- | --- |
| DL Bandwidth | 1.4 MHz |
| Sampling Rate | 1.92 MHz |
| SNR for 15 dB coverage | −14.2 dB |
| Antenna Configuration | 2 × 1 |

TABLE 2-continued

| Parameter | Setting |
| --- | --- |
| Channel Model | EPA |
| Max. Doppler Shift | 1 Hz |
| MIMO Correlation | Low |
| Carrier Frequency Offset (CFO) | 1 kHz |

Resynchronization of UE and Base Station

In accordance with embodiments of the present invention, there is provided a method and apparatus for using enhanced PSS (ePSS) transmitted from a base station for example, an eNB, for use by UEs for resynchronization of the UE with the base station. For this resynchronization, it is assumed that the UE has knowledge of the PSS and SSS, which can be indicative of the feature that the base station servicing the UE has not changed, however the carrier frequency offset (CFO) and timing are unknown to the UE.

Figure 14:
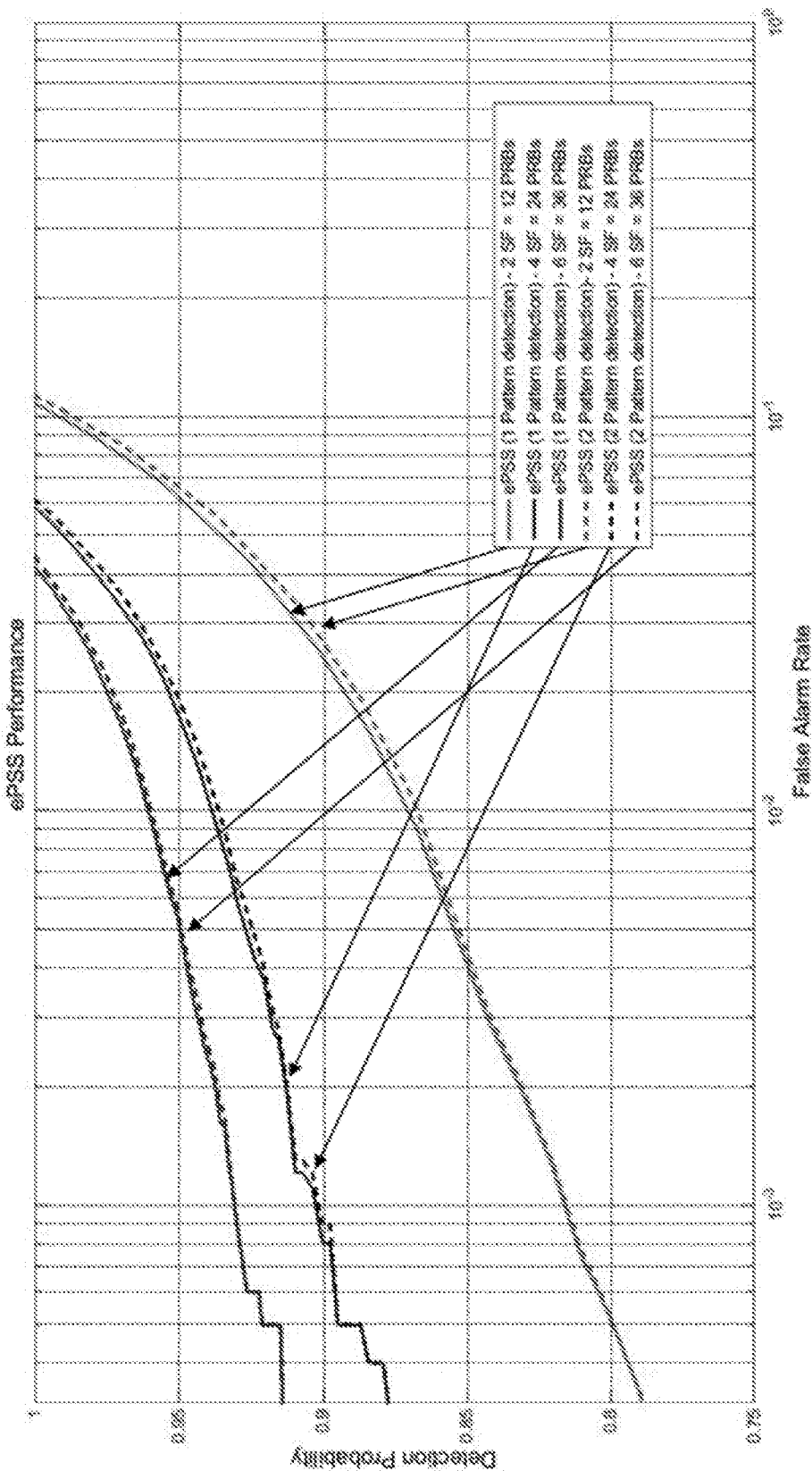
FIG. 14 illustrates the performance of using ePSS for resynchronization of a UE with a base station, in accordance with an embodiment of the present invention.

According to embodiments, using ePSS, for example a dense burst of one or more of PSS, SSS and other synchronization signals, for resynchronization can improve resynchronization of the UE with the base station. However, the amount of network resources, for example time and frequency, for an ePSS to provide a suitable single shot detection, for example 90th percentile detection, can be high. For example, with reference to FIG. 14, simulations indicate that, at 155 dB MCL, the ePSS needs to be 24 physical resource blocks (PRBs) to provide 90th percentile detection with a false alarm of 0.1%. For example 4 SF*6PRB=24 PRBs.

Figure 15:
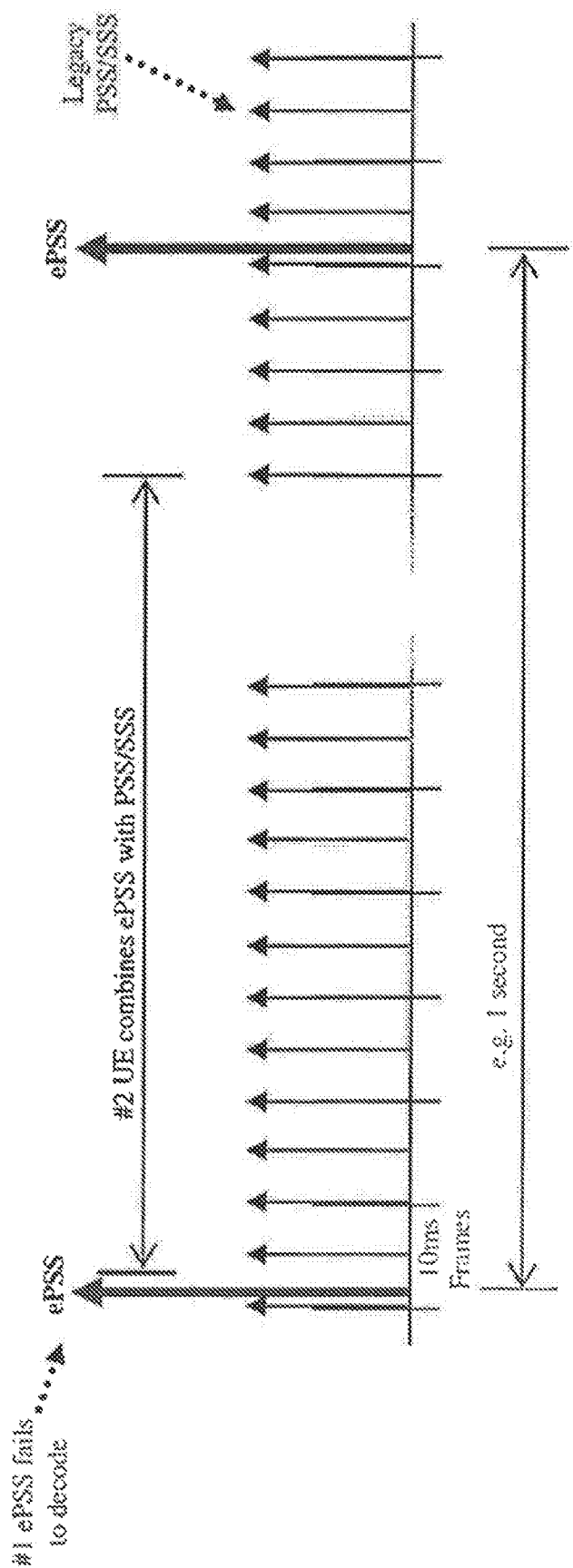
FIG. 15 illustrates the placement of ePSS in relation to PSS/SSS for resynchronization of a UE with a base station, in accordance with embodiments of the present invention.

Furthermore, for 164 dB, which is 9 dB above the simulation results, assuming linear gain, the ePSS resources required to obtain $90^{th}$ percentile detection would be $10^{(9/10)}$*24=190 PRBs. It is apparent that this level of resources required can be prohibitively large, while 10% of the time, the UE would fail to resynchronize using the single ePSS. In addition, if the ePSS is sent infrequently, for example every one second, the UE would need to wait 1 sec before the next copy of the ePSS is sent, which may be prohibitively long. FIG. 15 illustrates the placement of ePSS in relation to legacy PSS/SSS for resynchronization of a UE with a base station, in accordance with embodiments of the present invention.

According to some embodiments, if the UE fails to resynchronize using a first instance of the ePSS, the UE can use the legacy PSS/SSS signals, however this may take approximately 2.5 seconds.

According to some embodiments, when resynchronization of the UE and the base station using the ePSS fails to decode on the first attempt, the UE can non-coherently or coherently combine the failed ePSS results with the legacy PSS/SSS results in order to resynchronize the UE with the base station, for example the eNB.

According to embodiments, failure to decode the ePSS can be considered to occur when a correlation threshold is not met. For example, the correlation threshold can be a value necessary to achieve a predetermined rate of false detection. For example, the correlation threshold can be indicative of a less than 0.1% rate of false detection. It is understood that ePSS correlation results can specifically refer to an array of correlation results.

According to embodiments, the improvement in resynchronization time based on the correlation between ePSS and PSS/SSS can be approximated to be 10 ms*ePSS_size, wherein ePSS_size is in units of Legacy_Resync_Size=(2 PSS symbols+2 SSS symbols)*6 PRBs=4 symbols× 6PRBs=24 symbols×PRBs.

As an example, if the size of the ePSS is 12 Symbols×96 PRBs then the ePSS_Size is (12*96)/(24)=48 units of Legacy_Resync_Size. Accordingly, when ePSS is combined with PSS/SSS, the resynchronization time can be improved by approximately 48*10 ms=480 ms.

According to embodiments, the ePSS can provide more than just symbol timing but can also provide subframe (SF) timing, and the ePSS can be sent with different timing within the SF (for example the ePSS can end at the end of the SF). As such, the PSS/SSS (which can be sent in symbol 5 and 6 of the SF as shown in FIG. 4) is not time aligned with the ePSS. As such, the results of the ePSS or PSS/SSS need to be time adjusted by shifting the sequence or by zero padding the reference correlation sequence before combining. For example, the reference correlation sequence for the first set of synchronization signals is zero padded before combining.

According to embodiments, the method for resynchronizing a UE and a base station, includes transmitting a first set of synchronization signals and a second set of synchronization signals, wherein the time and frequency of the first set of synchronization signals is know a priori to the UE. In addition, the time and frequency of the second set of synchronization signals is sent wirelessly to the UE, for example the second set of synchronization signals can be the ePSS. During initial synchronization of the UE with the base station, the UE uses the first set of synchronization signals to synchronize to the base station.

According to embodiments, at a subsequent time, in order to resynchronize the UE with the base station, the UE uses the second set of synchronization signals to synchronize to the base station. If at this subsequent time the UE fails to synchronize with the base station using the second set of synchronization signals, the UE uses a modified set of synchronization signals to synchronize with the base station, wherein the modified set of synchronization signals is a combined version of the first set of synchronization signals and the second set of synchronization signals.

According to some embodiments, the second set of synchronization signals are time adjusted before they are combined with the first set of synchronization signals. According to some embodiments, the first set of synchronization signals are time adjusted before they are combined with the second set of synchronization signals.

According to some embodiments, the results of reception of the second set of synchronization signals are time adjusted before they are combined with the results of reception of the first set of synchronization signals. According to some embodiments, the results of reception of the first set of synchronization signals are time adjusted before they are combined with the results of reception of the second set of synchronization signals.

According to some embodiments, the second set of synchronization signals are non-coherently combined with the first set of synchronization signals, thereby creating the modified synchronization signals. According to some embodiments, the second set of synchronization signals are coherently combined with the first set of synchronization signals, thereby creating the modified synchronization signals. According to some embodiments, the modified synchronization signals used to synchronize the UE and the base station are generated by using a correlation of the second set of synchronization signals.

According to some embodiments, the results of reception of the second set of synchronization signals are non-coherently combined with the results of reception of the first set of synchronization signals, thereby creating the modified synchronization signals. According to some embodiments, the results of reception of the second set of synchronization signals are coherently combined with the results of reception of the first set of synchronization signals, thereby creating the modified synchronization signals. According to some embodiments, the modified synchronization signals used to synchronize the UE and the base station are generated by using a correlation of the results of reception of second set of synchronization signals.

According to some embodiments, the first set of synchronization signals are zero padded signals.

Methods and systems related to LTE wireless communication networks involving base stations such as eNBs and various types of UEs have been described herein. Parts and operation of existing eNBs and UEs will be readily understood by a worker skilled in the art. Further, it is contemplated that existing eNBs and UEs may be modified to operate in accordance with the present invention at least in part by reconfiguration of the operating instructions, routines and protocols executed thereby. Such modification may involve modification of machine instructions held in software or firmware of one or more electronic devices, modification of logic hardware such as Field Programmable Gate Arrays (FPGAs), modification of signal processing hardware, or the like, or a combination thereof.

Figure 16:
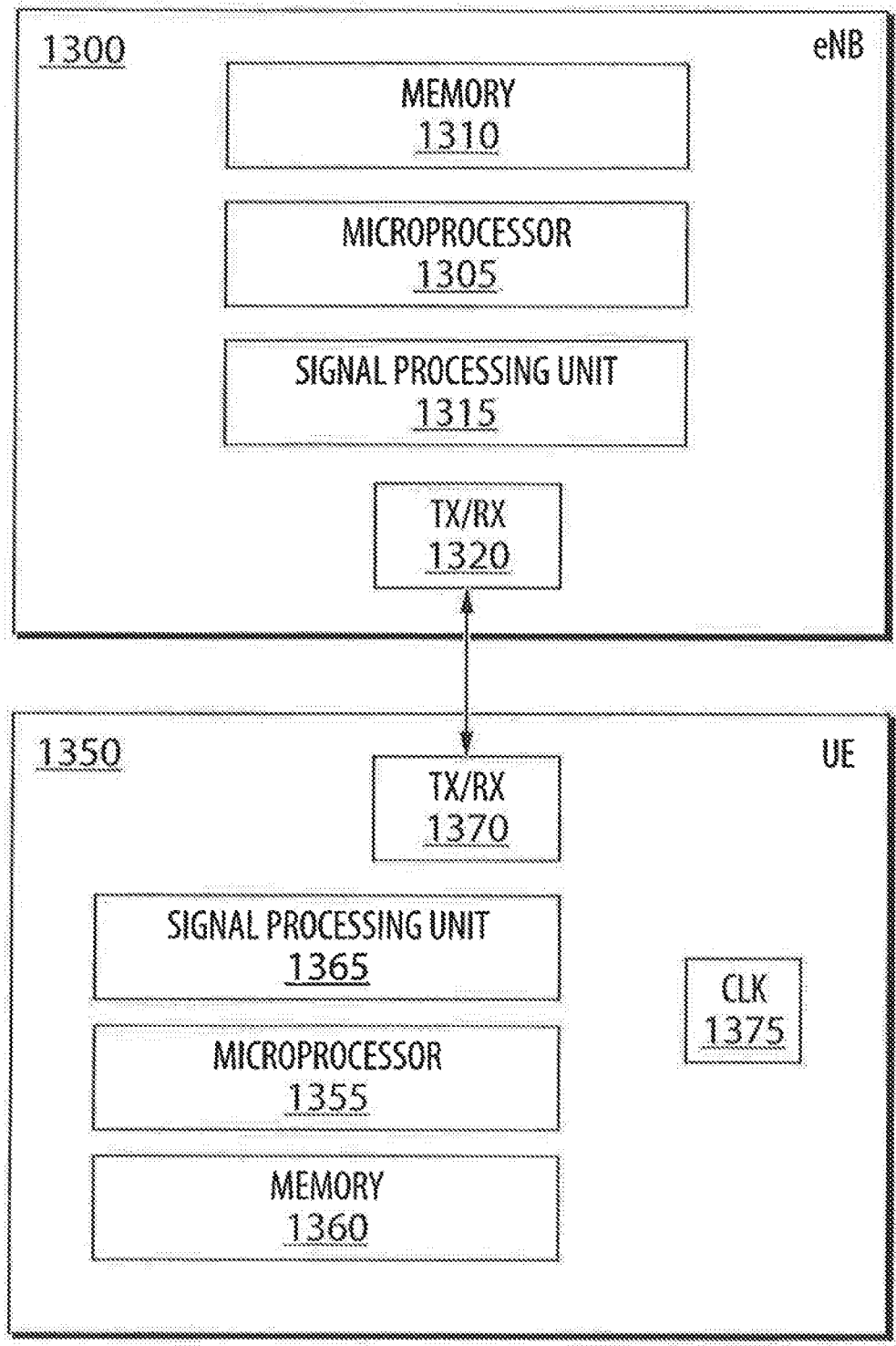
FIG. 16 illustrates a base station, for example an eNB and a UE provided in accordance with an embodiment of the present invention.

FIG. 16 illustrates an eNB and a UE provided in accordance with an embodiment of the present invention. The eNB 1300 includes at least a microprocessor 1305, a memory 1310 containing program instructions for execution by the microprocessor, a signal processing unit 1315 and a radio transceiver 1320. The UE 1350 similarly includes at least a microprocessor 1355, a memory 1360 containing program instructions for execution by the microprocessor, a signal processing unit 1365 and a radio transceiver 1370. The UE also includes a clock circuit 1375. The components of a signal processing unit may overlap with the components of corresponding radio transceiver. The signal processing unit and/or transceiver may be configured in accordance with the present invention through hardware, firmware, or both.

The microprocessor, signal processing unit and transceiver of the eNB are cooperatively configured to wirelessly transmit a burst of multiple signals, each indicative of a Primary Synchronization Signal (PSS), the burst of multiple signals transmitted within a predetermined time frame. The microprocessor, signal processing unit and transceiver of the UE are cooperatively configured to receive at least one signal of the burst of multiple signals; decode the PSS based on the received at least one signal; and adjust operation based at least in part on the decoded PSS. The microprocessor of the UE is further configured to perform the combining functions as disclosed elsewhere herein. Adjusting operation may include adjusting operation of the clock circuit 1375, for example by adjusting one or more of the clock time, the clock frequency and the clock phase.

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure some or all of its components in accordance with the system of the invention.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, PL/1, or the like. In addition, each step, or a file or object or the like implementing each said step, may be executed by special purpose hardware or a circuit module designed for that purpose.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

What is claimed is:

1. A method for resynchronizing a User Equipment (UE) to a base station, the method comprising:
receiving, by the UE, a first set of synchronization signals;
receiving, by the UE, a second set of synchronization signals; and
resynchronizing, by the UE, with the base station using the second set of
synchronizing signals,
wherein when resynchronizing with the base station using the second set of synchronizing signals fails, the method further comprising:
combining, by the UE, the first set of synchronizing signals and the second set of synchronizing signals to form a modified set of synchronizing signals;
resynchronizing, by the UE, with the base station using the modified set of synchronizing signals.

2. The method according to claim 1, wherein the combining is non-coherent combining.

3. The method according to claim 1, wherein the combining is coherent combining.

4. The method according to claim 1, wherein the second set of synchronization signals are time adjusted before combining the first set of synchronizing signals and the second set of synchronizing signals.

5. The method according to claim 1, wherein the first set of synchronization signals are time adjusted before combining the first set of synchronizing signals and the second set of synchronizing signals.

6. The method according to claim 1, wherein the first set of synchronization signals are zero padded before combining the first set of synchronizing signals and the second set of synchronizing signals.

7. A User Equipment (UE) for resynchronization with a base station, the UE comprising:
a processor; and
a machine readable memory storing machine readable instructions which when executed by the processor configure the UE to:
receive a first set of synchronization signals;
receive a second set of synchronization signals; and
resynchronize with the base station using the second set of synchronizing signals,
wherein when the resynchronizing with the base station using the second set of synchronizing signals fails, the machine readable instructions further configure the UE to:
combine the first set of synchronizing signals and the second set of synchronizing signals to form a modified set of synchronizing signals;
resynchronize with the base station using the modified set of synchronizing signals.

8. The UE according to claim 7, wherein the machine readable instructions configure the UE to non-coherently combine the first set of synchronizing signals and the second set of synchronizing signals to form the modified set of synchronizing signals.

9. The UE according to claim 7, wherein the machine readable instructions configure the UE to coherently combine the first set of synchronizing signals and the second set of synchronizing signals to form the modified set of synchronizing signals.

10. The UE according to claim 7, wherein the machine readable instructions configure the UE to time adjust the second set of synchronization signals before combining the first set of synchronizing signals and the second set of synchronizing signals.

11. The UE according to claim 7, wherein the machine readable instructions configure the UE to time adjust the first set of synchronization signals before combining the first set of synchronizing signals and the second set of synchronizing signals.

12. The UE according to claim 7, wherein the machine readable instructions configure the UE to apply zero padding to the first set of synchronization signals before combining the first set of synchronizing signals and the second set of synchronizing signals.

13. A method for resynchronizing a User Equipment (UE) to a base station, the method comprising:
receiving, by the UE, a first set of synchronization signals;
receiving, by the UE, a second set of synchronization signals; and
resynchronizing, by the UE, with the base station using the second set of synchronizing signals;
wherein the first set of synchronization signals are zero padded and combining the first set of synchronizing signals that are zero padded and the second set of synchronizing signals.

14. The method according to claim 13, wherein the combining is non-coherent combining.

15. The method according to claim 13, wherein the combining is coherent combining.

16. A User Equipment (UE) for resynchronization with a base station, the UE comprising:
a processor; and
a machine readable memory storing machine executable instructions which when executed by the processor configure the user equipment to:
receive a first set of synchronization signals;
receive a second set of synchronization signals; and resynchronize with the base station using the second set of synchronizing signals;
  wherein the first set of synchronization signals are zero padded and combining the first set of synchronizing signals that are zero padded and the second set of synchronizing signals.

17. The UE according to claim 16, wherein the combining is non-coherent combining.

18. The UE according to claim 16, wherein the combining is coherent combining.

* * * * *

UNITED STATES PATENT AND TRADEMARK OFFICE
CERTIFICATE OF CORRECTION

PATENT NO. : 10,764,847 B2  Page 1 of 1
APPLICATION NO. : 15/968929
DATED : September 1, 2020
INVENTOR(S) : Gustav Gerald Vos, Naveen Mysore Balasubramanya and Lutz Hans-Joachim Lampe It is certified that error appears in the above-identified patent and that said Letters Patent is hereby corrected as shown below:

In the Specification

In Column 1, Line 25, please delete "3GPP'" and insert -- 3GPP™ --;

In Column 4, Line 13, please delete "C." and insert -- C~. --; and

In Column 13, Line 4, please delete "(1=1, 2, . . . 7)" and insert -- (i=1, 2, . . . 7) --.

Signed and Sealed this
Twelfth Day of January, 2021

Andrei Iancu
*Director of the United States Patent and Trademark Office*